(12) United States Patent
Rosenberg

(10) Patent No.: US 10,712,929 B2
(45) Date of Patent: Jul. 14, 2020

(54) ADAPTIVE CONFIDENCE CALIBRATION FOR REAL-TIME SWARM INTELLIGENCE SYSTEMS

(71) Applicant: UNANIMOUS A. I., INC., San Francisco, CA (US)

(72) Inventor: Louis B. Rosenberg, San Luis Obispo, CA (US)

(73) Assignee: Unanimous A. I., Inc., San Francisco, CA (US)

(*) Notice: Subject to any disclaimer, the term of this patent is extended or adjusted under 35 U.S.C. 154(b) by 321 days.

(21) Appl. No.: 15/898,468

(22) Filed: Feb. 17, 2018

(65) Prior Publication Data

US 2018/0203580 A1 Jul. 19, 2018

Related U.S. Application Data

(63) Continuation-in-part of application No. 14/668,970, filed on Mar. 25, 2015, now Pat. No. 9,959,028, and
(Continued)

(51) Int. Cl.
*G06F 3/0484* (2013.01)
*G06F 3/0487* (2013.01)
(Continued)

(52) U.S. Cl.
CPC ........ *G06F 3/0487* (2013.01); *G06F 3/0484* (2013.01); *G06F 3/04812* (2013.01);
(Continued)

(58) Field of Classification Search
CPC ...................... G06F 3/0484; G06F 3/04842
See application file for complete search history.

(56) References Cited

U.S. PATENT DOCUMENTS

| 5,808,908 A | 9/1998 | Ghahramani |
| 7,158,112 B2 | 1/2007 | Rosenberg |

(Continued)

FOREIGN PATENT DOCUMENTS

| CA | 2414397 | 8/2003 |
| JP | 5293249 | 9/2013 |

(Continued)

OTHER PUBLICATIONS

"Dialogr—A simple tool for collective thinking"; Mar. 25, 2015; http://www.dialogr.com./; 1 page.
(Continued)

*Primary Examiner* — Dino Kujundzic
(74) *Attorney, Agent, or Firm* — Fitch, Even, Tabin & Flannery LLP

(57) ABSTRACT

Systems and methods are for enabling a group of individuals, each using an individual computing device, to collaboratively answer questions or otherwise express a collaborative will/intent in real-time as a unified intelligence. The collaboration system comprises a plurality of computing devices, each of the devices being used by an individual user, each of the computing devices enabling its user to contribute to the emerging real-time group-wise intent. A collaboration server is disclosed that communicates remotely to the plurality of individual computing devices. Herein, a variety of inventive methods are disclosed for interfacing users and calibrating for their variable confidence in a real-time synchronized group-wise experience, and for deriving a convergent group intent from the collective user input.

12 Claims, 11 Drawing Sheets

Related U.S. Application Data a continuation-in-part of application No. 14/708,038, filed on May 8, 2015, now abandoned, application No. 15/898,468, which is a continuation-in-part of application No. 14/738,768, filed on Jun. 12, 2015, now Pat. No. 9,940,006, application No. 15/898,468, which is a continuation-in-part of application No. 14/859,035, filed on Sep. 18, 2015, now Pat. No. 10,122,775, application No. 15/898,468, which is a continuation-in-part of application No. 14/920,819, filed on Oct. 22, 2015, now Pat. No. 10,277,645, application No. 15/898,468, which is a continuation-in-part of application No. 14/925,837, filed on Oct. 28, 2015, now Pat. No. 10,551,999, application No. 15/898,468, which is a continuation-in-part of application No. 15/017,424, filed on Feb. 5, 2016, now abandoned, application No. 15/898,468, which is a continuation-in-part of application No. 15/047,522, filed on Feb. 18, 2016, now Pat. No. 10,133,460, which is a continuation-in-part of application No. 15/052,876, filed on Feb. 25, 2016, now Pat. No. 10,110,664, application No. 15/898,468, which is a continuation-in-part of application No. 15/086,034, filed on Mar. 30, 2016, now Pat. No. 10,310,802, application No. 15/898,468, which is a continuation-in-part of application No. 15/199,990, filed on Jul. 1, 2016, now abandoned, application No. 15/898,468, which is a continuation-in-part of application No. 15/241,340, filed on Aug. 19, 2016, now Pat. No. 10,222,961, application No. 15/898,468, which is a continuation-in-part of application No. 15/640,145, filed on Jun. 30, 2017, now Pat. No. 10,353,551, application No. 15/898,468, which is a continuation-in-part of application No. 15/815,579, filed on Nov. 16, 2017, now Pat. No. 10,439,836, application No. 15/898,468, which is a continuation-in-part of application No. PCT/US2015/022594, filed on Mar. 25, 2015, and a continuation-in-part of application No. PCT/US2015/035694, filed on Jun. 12, 2015, and a continuation-in-part of application No. PCT/US2015/056394, filed on Oct. 20, 2015, and a continuation-in-part of application No. PCT/US2016/040600, filed on Jul. 1, 2016, and a continuation-in-part of application No. PCT/US2017/040480, filed on Jun. 30, 2017, and a continuation-in-part of application No. PCT/US2017/062095, filed on Nov. 16, 2017.

(60) Provisional application No. 15/898,468, provisional application No. 62/460,861, filed on Feb. 19, 2017, provisional application No. 62/473,442, filed on Mar. 19, 2017, provisional application No. 61/970,885, filed on Mar. 26, 2014, provisional application No. 61/991,505, filed on May 10, 2014, provisional application No. 62/012,403, filed on Jun. 15, 2014, provisional application No. 62/066,718, filed on Oct. 21, 2014, provisional application No. 62/067,505, filed on Oct. 23, 2014, provisional application No. 62/069,360, filed on Oct. 28, 2014, provisional application No. 62/113,393, filed on Feb. 7, 2015, provisional application No. 62/117,808, filed on Feb. 18, 2015, provisional application No. 62/120,618, filed on Feb. 25, 2015, provisional application No. 62/140,032, filed on Mar. 30, 2015, provisional application No. 62/187,470, filed on Jul. 1, 2015, provisional application No. 62/207,234, filed on Aug. 19, 2015, provisional application No. 62/358,026, filed on Jul. 3, 2016, provisional application No. 62/423,402, filed on Nov. 17, 2016.

(51) Int. Cl.
  *G06F 3/0481* (2013.01)
  *G06N 3/04* (2006.01)
  *G06N 3/08* (2006.01)
  *G06Q 10/10* (2012.01)
  *G06N 3/00* (2006.01)

(52) U.S. Cl.
  CPC ......... *G06F 3/04842* (2013.01); *G06N 3/006* (2013.01); *G06N 3/04* (2013.01); *G06N 3/08* (2013.01); *G06Q 10/10* (2013.01); *G06Q 10/101* (2013.01); *G06F 3/04817* (2013.01); *G06N 3/0481* (2013.01)

(56) References Cited

U.S. PATENT DOCUMENTS

| | | | |
|---|---|---|---|
| 7,489,979 B2 | 2/2009 | Rosenberg | |
| 7,542,816 B2 | 6/2009 | Rosenberg | |
| 7,562,117 B2 | 7/2009 | Rosenberg | |
| 7,603,414 B2 | 10/2009 | Rosenberg | |
| 7,917,148 B2 | 3/2011 | Rosenberg | |
| 7,937,285 B2 | 5/2011 | Goldberg | |
| 8,176,101 B2 | 5/2012 | Rosenberg | |
| 8,589,488 B2 | 11/2013 | Huston | |
| 8,745,104 B1 | 6/2014 | Rosenberg | |
| 8,762,435 B1 | 6/2014 | Rosenberg | |
| 2002/0107726 A1* | 8/2002 | Torrance | G09B 7/02 705/12 |
| 2002/0171690 A1 | 11/2002 | Fox | |
| 2003/0065604 A1 | 4/2003 | Gatto | |
| 2003/0079218 A1 | 4/2003 | Goldberg | |
| 2004/0210550 A1 | 10/2004 | Williams | |
| 2005/0168489 A1 | 8/2005 | Ausbeck | |
| 2005/0218601 A1 | 10/2005 | Capellan | |
| 2006/0147890 A1 | 7/2006 | Bradford | |
| 2006/0200401 A1 | 9/2006 | Lisani | |
| 2006/0218179 A1* | 9/2006 | Gardner | G06Q 40/00 |
| 2006/0250357 A1 | 11/2006 | Safai | |
| 2007/0097150 A1 | 5/2007 | Ivashin | |
| 2007/0099162 A1 | 5/2007 | Sekhar | |
| 2007/0124503 A1 | 5/2007 | Ramos | |
| 2007/0211050 A1 | 9/2007 | Ohta | |
| 2007/0220100 A1 | 9/2007 | Rosenberg | |
| 2008/0103877 A1 | 5/2008 | Gerken | |
| 2009/0037355 A1 | 2/2009 | Brave | |
| 2009/0063379 A1 | 3/2009 | Kelly | |
| 2009/0063463 A1 | 3/2009 | Turner | |
| 2009/0063991 A1 | 3/2009 | Baron | |
| 2009/0287685 A1 | 11/2009 | Charnock | |
| 2009/0325533 A1 | 12/2009 | Lele | |
| 2010/0100204 A1* | 4/2010 | Ng | A63F 13/12 700/91 |
| 2010/0169144 A1 | 7/2010 | Estill | |
| 2010/0174579 A1 | 7/2010 | Hughes | |
| 2010/0299616 A1 | 11/2010 | Chen | |
| 2011/0087687 A1 | 4/2011 | Immaneni | |
| 2011/0119048 A1 | 5/2011 | Shaw | |
| 2011/0141027 A1 | 6/2011 | Ghassabian | |
| 2011/0288919 A1* | 11/2011 | Gross | G06Q 30/02 705/14.19 |
| 2012/0011006 A1 | 1/2012 | Schultz | |
| 2012/0013489 A1 | 1/2012 | Earl | |
| 2012/0079396 A1 | 3/2012 | Neer | |
| 2012/0109883 A1 | 5/2012 | Iordanov | |
| 2012/0191774 A1 | 7/2012 | Bhaskaran | |
| 2012/0290950 A1 | 11/2012 | Rapaport | |
| 2013/0035989 A1* | 2/2013 | Brown | G06Q 30/0201 705/7.33 |
| 2013/0041720 A1 | 2/2013 | Spires | |
| 2013/0097245 A1* | 4/2013 | Adarraga | G06F 3/04842 709/204 |

(56) References Cited

U.S. PATENT DOCUMENTS

| | | | |
|---|---|---|---|
| 2013/0103692 A1* | 4/2013 | Raza | G06Q 50/01 707/741 |
| 2013/0171594 A1 | 7/2013 | Gorman | |
| 2013/0231595 A1 | 9/2013 | Zoss | |
| 2013/0298690 A1 | 11/2013 | Bond | |
| 2013/0311904 A1 | 11/2013 | Tien | |
| 2013/0339445 A1 | 12/2013 | Perincherry | |
| 2014/0108915 A1 | 4/2014 | Lu | |
| 2014/0128162 A1 | 5/2014 | Arafat | |
| 2014/0129946 A1 | 5/2014 | Harris | |
| 2014/0162241 A1 | 6/2014 | Morgia | |
| 2014/0249889 A1 | 9/2014 | Park | |
| 2014/0258970 A1 | 9/2014 | Brown | |
| 2014/0279625 A1 | 9/2014 | Carter | |
| 2014/0337097 A1 | 11/2014 | Farlie | |
| 2014/0351719 A1* | 11/2014 | Cattermole | H04L 65/403 715/753 |
| 2014/0379439 A1 | 12/2014 | Sekhar | |
| 2015/0120619 A1* | 4/2015 | Baughman | G06N 7/005 706/12 |
| 2015/0156233 A1 | 6/2015 | Bergo | |
| 2015/0170050 A1 | 6/2015 | Price | |
| 2015/0242755 A1* | 8/2015 | Gross | G06Q 50/01 706/46 |
| 2015/0302308 A1 | 10/2015 | Bartek | |
| 2015/0331601 A1 | 11/2015 | Rosenberg | |
| 2017/0091633 A1* | 3/2017 | Vemula | G06Q 10/06 |

FOREIGN PATENT DOCUMENTS

| | | |
|---|---|---|
| KR | 101273535 | 6/2013 |
| WO | 204023432 | 1/2014 |
| WO | 2014190351 | 11/2014 |

OTHER PUBLICATIONS

Beni; "From Swarm Intelligence to Swarm Robotics"; Swarm Robotics WS 2004, LNCS 3342; pp. 1-9; 2005.

Cuthbertson; "Artificial Intelligence Turns $20 into $11,000 in Kentucky Derby Bet"; Newsweek Tech & Science; http://www.newsweek.com/artificial-intelligence-turns-20-11000-kentucky-derby-bet-457783; May 10, 2016; 9 pages.

Cuthbertson; "Oscar Predictions: AI Calculates Leonardo DiCaprio Will Finally Get His Oscar"; Newsweek Tech & Science; http://www.newsweek.com/oscar-predictions-artificial-intelligence-predicts-leo-will-finally-get-his-430712; Feb. 26, 2016; 3 pages.

Cuthbertson; "Swarm Intelligence: AI Algorithm Predicts the Future"; Newsweek Tech & Science; http://www.newsweek.com/swarm-intelligence-ai-algorithm-predicts-future-418707; Jan. 25, 2016; 4 pages.

Deck et al; "Prediction Markets in the Laboratory"; University of Arkansas and Chapman University; J. Econ. Surv., 2013; 33 pages.

Deneubourg et al; "Collective Patterns and Decision-Making"; Ethology Ecology & Evolution; Mar. 22, 1989; pp. 295-311.

Ding et al; "Time Weight Collaborative Filtering"; CIKM'05, Oct. 31-Nov. 5, 2005; Bremen, Germany; pp. 485-492.

EP; Extended European Search Report for EP Application No. 15767909.3 mailed from the European Patent Office dated Sep. 4, 2017.

EP; Extended European Search Report for EP Application No. 15808982.1 mailed from the European Patent Office dated Nov. 28, 2017.

Gauchou et al; "Expression of Nonconscious Knowledge via Ideomotor Actions"; Consciousness and Cognition; Jul. 28, 2011; 9 pages.

Green; "Testing and Quantifying Collective Intelligence"; Collective Intelligence 2015; May 31, 2015; 4 pages.

Hanson et al; "Information Aggregation and Manipulation in an Experimental Market"; Interdisciplinary Center for Economic Science, George Mason University; Jul. 12, 2005; 15 pages.

Herkewitz; "Upvotes, Downvotes, and the Science of the Reddit Hivemind"; Aug. 8, 2013; http://www.popularmechanics.com/science/health/a9335/upvotes-downvotes-and-the-scien . . . ; downloaded Mar. 25, 2015; 10 pages.

International Search Report and Written Opinion of the International Searching Authority for PCT/US2015/022594 dated Jun. 29, 2015.

Malone et al; "Harnessing Crowds: Mapping the Genome of Collective Intelligence"; MIT Center for Collective Intelligence; Feb. 2009; 20 pages.

Meyer; "Meet Loomio, The Small-Scale Decision-Making Platform With The Biggest Ambitions"; Mar. 13, 2014; https://gigaom.com/2014/03/13/meet-loomio-the-small-scale-decision-making-platform-wi . . . ; downloaded Mar. 25, 2015; 11 pages.

PCT; International Search Report and Written Opinion of the International Searching Authority for PCT/US2015/035694 dated Aug. 28, 2015.

PCT; International Search Report and Written Opinion of the International Searching Authority for PCT/US2015/56394 dated Feb. 4, 2016.

PCT; International Search Report and Written Opinion of the International Searching Authority for PCT/US2016/040600 dated Nov. 29, 2016.

PCT; International Search Report and Written Opinion of the International Searching Authority for PCT/US2017/040480 dated Oct. 23, 2017.

Rand et al; "Dynamic Social Networks Promote Cooperation in Experiments with Humans"; PNAS; Nov. 29, 2011; vol. 108, No. 48; pp. 19193-19198.

Robertson; "After Success of Mob-Run 'Pokemon', Twitch Bets on Turning Viewers Into 'Torture Artists' Streaming Game Platform Helps Fund 'Choice Chamber', Where the Chat Window Sets the Challenges"; The Verge; Apr. 16, 2014; http://www.theverge.com/2014/4/16/5618334/twitch-streaming-platform-funds-viewer-con . . . ; downloaded Mar. 25, 2015; 4 pages.

Rosenberg et al; "Amplifying Prediction Accuracy Using Swarm A. I."; Intelligent Systems Conference 2017; Sep. 7, 2017; 5 pages.

Rosenberg et al; "Crowds vs. Swarms, A Comparison of Intelligence"; IEEE; Oct. 21, 2016; 4 pages.

Rosenberg; "Artificial Swarm Intelligence vs. Human Experts"; Neural Networks (IJCNN); 2016 International Joint Conference on IEEE; Jul. 24, 2016; 5 pages.

Rosenberg; "Artificial Swarm Intelligence, a human-in-the-loop approach to A. I."; Association for the Advancement of Artificial Intelligence; Feb. 12, 2016; 2 pages.

Rosenberg; "Human Swarming and the Future of Collective Intelligence"; Singularity WebLog; https://www.singularityweblog.com/human-swarming-and-the-future-of-collective-intelligence/; Jul. 19, 2015; 7 pages.

Rosenberg; "Human Swarming, a real-time method for Parallel Distributed Intelligence"; Proceedings of IEEE, 2015 Swarm/Human Blended Intelligence; Sep. 28, 2015; 7 pages.

Rosenberg; "Human Swarms Amplify Accuracy in Honesty Detection"; Collective Intelligence 2017; Jun. 15, 2017; 5 pages.

Rosenberg; "Human Swarms, A Real-Time Method for Collective Intelligence"; Proceedings of the European Conference on Artificial Life 2015; Jul. 20, 2015; pp. 658-659.

Rosenberg; "Monkey Room Book One"; Outland Pictures; Amazon ebook; Jan. 15, 2014; 39 pages.

Rosenberg; "Monkey Room Book Three"; Outland Pictures; Amazon ebook; Feb. 20, 2014; 22 pages.

Rosenberg; "Monkey Room Book Two"; Outland Pictures; Amazon ebook; Feb. 9, 2014; 27 pages.

Rosenberg; "Monkey Room"; Outland Pictures; Amazon; Mar. 30, 2014; 110 pages.

Rosenberg; "New Hope for Humans in an A. I. World"; TEDxKC—You Tube; Sep. 7, 2017; http://www.youtube.com/watch?v=EuRyZT_Uas.

Rosenberg; U.S. Appl. No. 14/668,970, filed Mar. 25, 2015.
Rosenberg; U.S. Appl. No. 14/708,038, filed May 8, 2015.
Rosenberg; U.S. Appl. No. 14/738,768, filed Jun. 12, 2015.
Rosenberg; U.S. Appl. No. 14/859,035, filed Sep. 18, 2015.
Rosenberg; U.S. Appl. No. 14/920,819, filed Oct. 22, 2015.

(56) References Cited

OTHER PUBLICATIONS

Rosenberg; U.S. Appl. No. 14/925,837, filed Oct. 28, 2015.
Rosenberg; U.S. Appl. No. 15/017,424, filed Feb. 5, 2016.
Rosenberg; U.S. Appl. No. 15/047,522, filed Feb. 18, 2016.
Rosenberg; U.S. Appl. No. 15/052,876, filed Feb. 25, 2016.
Rosenberg; U.S. Appl. No. 15/086,034, filed Mar. 30, 2016.
Rosenberg; U.S. Appl. No. 15/199,990, filed Jul. 1, 2016.
Rosenberg; U.S. Appl. No. 15/241,340, filed Aug. 19, 2016.
Rosenberg; U.S. Appl. No. 15/640,145, filed Jun. 30, 2017.
Rosenberg; U.S. Appl. No. 15/904,239, filed Feb. 23, 2018.
Salminen; "Collective Intelligence in Humans: A Literature Review"; Lappeenranta University of Technology, Lahti School of Innovation; 1Proceedings; 2012; 8 pages.
Souppouris; "Playing 'Pokemon' with 78,000 People is Frustratingly Fun"; The Verge; Feb. 17, 2014; http://www.theverge.com/2014/2/17/5418690/play-this-twitch-plays-pokemon-crowdsource . . . ; downloaded Mar. 25, 2015; 3 pages.
Stafford; "How the Ouija Board Really Moves"; BBC Future; Jul. 30, 2013; http://www.bbc.com/future/story/20130729-what-makes-the-ouija-board-move; downloaded Mar. 25, 2015; 5 pages.
Surowiecki; "The Wisdom of Crowds—Why the Many Are Smarter Than the Few and How Collective Wisdom Shapes Business, Economies, Societies, and Nations"; Business Book Review; vol. 21, No. 43; 2006; 10 pages.
Unanimous A. I.; "What is Swarm Intelligence"; 2015; http://unu.ai/swarm-intelligence/; downloaded Oct. 6, 2016; 3 pages.
USPTO; Non-Final Office Action for U. S. Appl. No. 14/738,768 dated Sep. 8, 2017.
USPTO; Non-Final Office Action for U.S. Appl. No. 15/047,522 dated Jan. 5, 2018.
USPTO; Non-Final Office Action for U.S. Appl. No. 14/708,038 dated Feb. 15, 2018.
USPTO; Non-Final Office Action for U.S. Appl. No. 14/859,035 dated Feb. 12, 2018.
USPTO; Non-Final Office Action for U.S. Appl. No. 15/052,876 dated Feb. 22, 2018.
USPTO; Non-Final Office Action for U.S. Appl. No. 15/086,034 dated Feb. 2, 2018.
USPTO; Non-Final Office Action for U.S. Appl. No. 16/668,970 dated Aug. 15, 2017.
USPTO; Notice of Allowance for U.S. Appl. No. 14/668,970 dated Feb. 8, 2018.
USPTO; Notice of Allowance for U.S. Appl. No. 14/738,768 dated Feb. 2, 2018.
Wikipedia; "Swarm (simulation)"; Jul. 22, 2016; http://en.wikipedia.org/wiki/Swarm_(simulation); downloaded Oct. 6, 2016; 2 pages.
Wikipedia; "Swarm intelligence"; Aug. 31, 2016; http://en.wikipedia.org/wiki/Swarm_intelligence; downloaded Oct. 6, 2016; 8 pages.
Yeung et al.; "Metacognition in human decision-making: confidence and error monitoring"; Philosophical Transactions of the Royal Society B; 2012; pp. 1310-1321.

\* cited by examiner

ADAPTIVE CONFIDENCE CALIBRATION FOR REAL-TIME SWARM INTELLIGENCE SYSTEMS

This application claims the benefit of U.S. Provisional Application No. 62/460,861 entitled ARTIFICIAL SWARM INTELLIGENCE WITH ADAPTIVE CONFIDENCE CALIBRATION, filed Feb. 19, 2017, which is incorporated in its entirety herein by reference.

This application claims the benefit of U.S. Provisional Application No. 62/473,442 entitled ARTIFICIAL SWARM INTELLIGENCE WITH ADAPTIVE CONFIDENCE CALIBRATION, filed Mar. 19, 2017, which is incorporated in its entirety herein by reference.

This application is a continuation-in-part of U.S. application Ser. No. 14/668,970 entitled METHODS AND SYSTEMS FOR REAL-TIME CLOSED-LOOP COLLABORATIVE INTELLIGENCE, filed Mar. 25, 2015, which in turn claims the benefit of U.S. Provisional Application 61/970,885 entitled METHOD AND SYSTEM FOR ENABLING A GROUPWISE COLLABORATIVE CONSCIOUSNESS, filed Mar. 26, 2014, both of which are incorporated in their entirety herein by reference.

This application is a continuation-in-part of U.S. application Ser. No. 14/708,038 entitled MULTI-GROUP METHODS AND SYSTEMS FOR REAL-TIME MULTI-TIER COLLABORATIVE INTELLIGENCE, filed May 8, 2015, which in turn claims the benefit of U.S. Provisional Application 61/991,505 entitled METHODS AND SYSTEM FOR MULTI-TIER COLLABORATIVE INTELLIGENCE, filed May 10, 2014, both of which are incorporated in their entirety herein by reference.

This application is a continuation-in-part of U.S. application Ser. No. 14/738,768 entitled INTUITIVE INTERFACES FOR REAL-TIME COLLABORATIVE INTELLIGENCE, filed Jun. 12, 2015, which in turn claims the benefit of U.S. Provisional Application 62/012,403 entitled INTUITIVE INTERFACE FOR REAL-TIME COLLABORATIVE CONTROL, filed Jun. 15, 2014, both of which are incorporated in their entirety herein by reference.

This application is a continuation-in-part of U.S. application Ser. No. 14/859,035 entitled SYSTEMS AND METHODS FOR ASSESSMENT AND OPTIMIZATION OF REAL-TIME COLLABORATIVE INTELLIGENCE SYSTEMS, filed Sep. 18, 2015 which in turn claims the benefit of U.S. Provisional Application No. 62/066,718 entitled SYSTEM AND METHOD FOR MODERATING AND OPTIMIZING REAL-TIME SWARM INTELLIGENCES, filed Oct. 21, 2014, both of which are incorporated in their entirety herein by reference.

This application is a continuation-in-part of U.S. application Ser. No. 14/920,819 entitled SUGGESTION AND BACKGROUND MODES FOR REAL-TIME COLLABORATIVE INTELLIGENCE SYSTEMS, filed Oct. 22, 2015 which in turn claims the benefit of U.S. Provisional Application No. 62/067,505 entitled SYSTEM AND METHODS FOR MODERATING REAL-TIME COLLABORATIVE DECISIONS OVER A DISTRIBUTED NETWORKS, filed Oct. 23, 2014, both of which are incorporated in their entirety herein by reference.

This application is a continuation-in-part of U.S. application Ser. No. 14/925,837 entitled MULTI-PHASE MULTI-GROUP SELECTION METHODS FOR REAL-TIME COLLABORATIVE INTELLIGENCE SYSTEMS, filed Oct. 28, 2015 which in turn claims the benefit of U.S. Provisional Application No. 62/069,360 entitled SYSTEMS AND METHODS FOR ENABLING AND MODERATING A MASSIVELY-PARALLEL REAL-TIME SYNCHRONOUS COLLABORATIVE SUPER-INTELLIGENCE, filed Oct. 28, 2014, both of which are incorporated in their entirety herein by reference.

This application is a continuation-in-part of U.S. application Ser. No. 15/017,424 entitled ITERATIVE SUGGESTION MODES FOR REAL-TIME COLLABORATIVE INTELLIGENCE SYSTEMS, filed Feb. 5, 2016 which in turn claims the benefit of U.S. Provisional Application No. 62/113,393 entitled SYSTEMS AND METHODS FOR ENABLING SYNCHRONOUS COLLABORATIVE CREATIVITY AND DECISION MAKING, filed Feb. 7, 2015, both of which are incorporated in their entirety herein by reference.

This application is a continuation-in-part of U.S. application Ser. No. 15/047,522 entitled SYSTEMS AND METHODS FOR COLLABORATIVE SYNCHRONOUS IMAGE SELECTION, filed Feb. 18, 2016 which in turn claims the benefit of U.S. Provisional Application No. 62/117,808 entitled SYSTEM AND METHODS FOR COLLABORATIVE SYNCHRONOUS IMAGE SELECTION, filed Feb. 18, 2015, both of which are incorporated in their entirety herein by reference.

This application is a continuation-in-part of U.S. application Ser. No. 15/052,876 entitled DYNAMIC SYSTEMS FOR OPTIMIZATION OF REAL-TIME COLLABORATIVE INTELLIGENCE, filed Feb. 25, 2016 which in turn claims the benefit of U.S. Provisional Application No. 62/120,618 entitled APPLICATION OF DYNAMIC RESTORING FORCES TO OPTIMIZE GROUP INTELLIGENCE IN REAL-TIME SOCIAL SWARMS, filed Feb. 25, 2015, both of which are incorporated in their entirety herein by reference.

This application is a continuation-in-part of U.S. application Ser. No. 15/086,034 entitled SYSTEM AND METHOD FOR MODERATING REAL-TIME CLOSED-LOOP COLLABORATIVE DECISIONS ON MOBILE DEVICES, filed Mar. 30, 2016 which in turn claims the benefit of U.S. Provisional Application No. 62/140,032 entitled SYSTEM AND METHOD FOR MODERATING A REAL-TIME CLOSED-LOOP COLLABORATIVE APPROVAL FROM A GROUP OF MOBILE USERS filed Mar. 30, 2015, both of which are incorporated in their entirety herein by reference.

This application is a continuation-in-part of U.S. application Ser. No. 15/199,990 entitled METHODS AND SYSTEMS FOR ENABLING A CREDIT ECONOMY IN A REAL-TIME COLLABORATIVE INTELLIGENCE, filed Jul. 1, 2016, which in turn claims the benefit of U.S. Provisional Application No. 62/187,470 entitled METHODS AND SYSTEMS FOR ENABLING A CREDIT ECONOMY IN A REAL-TIME SYNCHRONOUS COLLABORATIVE SYSTEM filed Jul. 1, 2015, both of which are incorporated in their entirety herein by reference.

This application is a continuation-in-part of U.S. application Ser. No. 15/241,340 entitled METHODS FOR ANALYZING DECISIONS MADE BY REAL-TIME INTELLIGENCE SYSTEMS, filed Aug. 19, 2016, which in turn claims the benefit of U.S. Provisional Application No. 62/207,234 entitled METHODS FOR ANALYZING THE DECISIONS MADE BY REAL-TIME COLLECTIVE INTELLIGENCE SYSTEMS filed Aug. 19, 2015, both of which are incorporated in their entirety herein by reference.

This application is a continuation-in-part of U.S. application Ser. No. 15/640,145 entitled METHODS AND SYSTEMS FOR MODIFYING USER INFLUENCE DURING A COLLABORATIVE SESSION OF REAL-TIME COL- LABORATIVE INTELLIGENCE SYSTEM, filed Jun. 30, 2017, which in turn claims the benefit of U.S. Provisional Application No. 62/358,026 entitled METHODS AND SYSTEMS FOR AMPLIFYING THE INTELLIGENCE OF A HUMAN-BASED ARTIFICIAL SWARM INTELLIGENCE filed Jul. 3, 2016, both of which are incorporated in their entirety herein by reference.

This application is a continuation-in-part of U.S. application Ser. No. 15/815,579 entitled SYSTEMS AND METHODS FOR HYBRID SWARM INTELLIGENCE, filed Nov. 16, 2017, which in turn claims the benefit of U.S. Provisional Application No. 62/423,402 entitled SYSTEM AND METHOD FOR HYBRID SWARM INTELLIGENCE filed Nov. 17, 2016, both of which are incorporated in their entirety herein by reference.

This application is a continuation-in-part of International Application No. PCT/US15/22594, filed Mar. 25, 2015.

This application is a continuation-in-part of International Application No. PCT/US15/35694, filed Jun. 12, 2015.

This application is a continuation-in-part of International Application No. PCT/US15/56394, filed Oct. 20, 2015.

This application is a continuation-in-part of International Application No. PCT/US16/40600, filed Jul. 1, 2016.

This application is a continuation-in-part of International Application No. PCT/US17/40480, filed Jun. 30, 2017.

This application is a continuation-in-part of International Application No. PCT/US17/62095, filed Nov. 16, 2017.

BACKGROUND OF THE INVENTION

1. Field of the Invention

The present invention relates generally to facilitating group collaboration, and more specifically to facilitating collaboration with closed-loop, dynamic group feedback.

2. Discussion of the Related Art

Computing devices, such as cell phones, personal digital assistants, and portable media players have become popular personal devices due to their highly portable nature, their ability to provide accessibility to a large library of stored media files, their interconnectivity with existing computer networks, and their ability to pass information to other computing devices and/or to centralized servers through phone networks, wireless networks and/or through local spontaneous networks such as Bluetooth® networks. Many of these devices also provide the ability to store and display media, such as songs, videos, podcasts, ebooks, maps, and other related content and/or programming. Many of these devices are also used as navigation tools, including GPS functionality. Many of these devices are also used as personal communication devices, enabling phone, text, picture, and video communication with other similar portable devices. Many of these devices include touch screens, tilt interfaces, voice recognition, and other modern user input modes. As a result, the general social trend within industrial societies is that every person does now or soon will maintain at least one such multi-purpose electronic device upon their person at most times, especially when out and about.

While such devices allow accessing information and person to person communication, they do not provide any unique tools and infrastructure that specifically enable groups of electronically networked individuals to have a real-time group-wise experience that evokes the group's collaborative intent and intelligence (Collaborative Consciousness). Natural systems such as flocks of birds, schools of fish and swarms of bees have evolved powerful methods to combine diverse input from large groups of individuals and produce highly optimized decisions. Referred to as Swarm Intelligence, these natural organisms achieve this remarkable feat by forming real-time close-loop systems that converge on optimized solutions. Hence, there is a substantial need to provide tools and methods by which groups of individuals, each having a computing device upon their person, to more easily contribute their personal will/intent to an emerging collaborative consciousness, allowing the group to collectively answer questions or otherwise express their groupwise will in real-time. Furthermore, there is a need to provide tools and methods that enable groups of users to be informed of the group-wise will that is emerging in real-time. The present invention, as described herein, addresses these and other deficiencies present in the art.

SUMMARY OF THE INVENTION

Several embodiments of the invention advantageously address the needs above as well as other needs by providing a method for determining an adaptive confidence calibration weighting factor associated with a user included in a group of users, wherein each user in the group is associated with a computing device in communication with a central collaboration server, wherein the adaptive confidence calibration weighting factor is used to weight input of the user during a real-time collaborative session, comprising the steps of: displaying, to the user by a computing device configured for the collaborative session, a plurality of questions; inputting, to the computing device by the user, a user answer for each question; inputting, to the computing device by the user, a user prediction value corresponding to the percentage of questions the user predicts he answered correctly; inputting, to the computer device by the user, a group prediction value corresponding to an average percentage of questions the user predicts the group answered correctly; determining, by the computing device, a user percentage of questions answered correctly by the user; sending, by the computing device, the user percentage to the collaboration server; receiving, by the computing device from the collaboration server, a group percentage of questions answered correctly by the group; and calculating, by the computing device, of the adaptive confidence calibration weighting factor for the user based on at least one of comparing the user prediction value to the user percentage and comparing the group prediction value to the group percentage.

In another embodiment, the invention can be characterized as a method for a collaborative intelligence session of a group of users, each user associated with a computing device, and assigned an input weighting factor, each computing device configured to display session information, receive session input from the user, transmit the session input to a central collaboration server and receive session information from a central collaboration server in networked communication with the plurality of computing devices, the collaboration server including a processor and a memory, the processor configured to run a collaboration mediation application stored on the memory, the collaboration mediation application configured to: sending the information for the group collaboration session to each of the plurality of computing devices; receiving, repeatedly in real-time during the session, a user intent vector including a magnitude from each of the plurality of computing devices; weighting, repeatedly in real-time during the session, each user intent vector magnitude based on the input weighting factor for that user, whereby a weighted user intent vector is determined for each user; responsively determining, repeatedly in real-time during the session, a group intent vector from the plurality of weighted user intent vectors; determining, repeatedly in real-time during the session, a group response indication from the group intent vector; sending, repeatedly in real-time during the session, the group response to the plurality of computing devices; and displaying, repeatedly in real-time during the session, by each computing device, the group response.

In yet another embodiment, the invention can be characterized as a method for using question responses to train a neural network to determine an adaptive confidence calibration weighting factor for use in a real-time collaboration session, comprising the steps of: collecting data from each of a large number of users, the data including a first set of user-submitted answers for each of a first set of questions, a percentage corresponding to how many of the first set of user-submitted answers were correct answers; a second set of user-submitted answers for each of a second set of questions, and a third set of user-submitted answers corresponding to each of a third set of questions; inputting the data to the neural network; determining a predicted percent accuracy of each user based on the user-submitted answers to the first set of questions, the second set of questions, and the third set of questions; comparing the predicted percent accuracy to the percentage; and adjusting the determining of the predicted percent accuracy based on the comparing.

In yet another embodiment, the invention can be characterized as a system comprising a user having a computing device and a central collaboration server, determining an adaptive confidence calibration weighting factor associated with the user included in a group of users, wherein each user in the group is associated with a computing device in communication with the central collaboration server, wherein the adaptive confidence calibration weighting factor is used to weight input of the user during a real-time collaborative session, wherein the system is configured to: display, to the user by the computing device configured for the collaborative session, a plurality of questions; input, to the computing device by the user, a user answer for each question; input, to the computing device by the user, a user prediction value corresponding to the percentage of questions the user predicts he answered correctly; input, to the computer device by the user, a group prediction value corresponding to an average percentage of questions the user predicts the group answered correctly; determine, by the computing device, a user percentage of questions answered correctly by the user; send, by the computing device, the user percentage to the collaboration server; receive, by the computing device from the collaboration server, a group percentage of questions answered correctly by the group; and calculate, by the computing device, of the adaptive confidence calibration weighting factor for the user based on at least one of comparing the user prediction value to the user percentage and comparing the group prediction value to the group percentage.

In yet another embodiment, the invention can be characterized as a system comprising a group of users and a central collaboration server, the system configured to perform a collaborative intelligence session of the group of users, each user associated with a computing device, and assigned an input weighting factor, each computing device configured to display session information, receive session input from the user, transmit the session input to a central collaboration server and receive session information from the central collaboration server in networked communication with the plurality of computing devices, the collaboration server including a processor and a memory, the processor configured to run a collaboration mediation application stored on the memory, wherein the system is configured to: send the information for the group collaboration session to each of the plurality of computing devices; receive, repeatedly in real-time during the session, a user intent vector including a magnitude from each of the plurality of computing devices; weight, repeatedly in real-time during the session, each user intent vector magnitude based on the input weighting factor for that user, whereby a weighted user intent vector is determined for each user; responsively determine, repeatedly in real-time during the session, a group intent vector from the plurality of weighted user intent vectors; determine, repeatedly in real-time during the session, a group response indication from the group intent vector; send, repeatedly in real-time during the session, the group response to the plurality of computing devices; and display, repeatedly in real-time during the session, by each computing device, the group response.

In yet another embodiment, the invention can be characterized as a system comprising a large number of users and a neural network, the system configured to use question responses to train the neural network to determine an adaptive confidence calibration weighting factor for use in a real-time collaboration session, wherein the system is configured to: collect data from each of the large number of users, the data including a first set of user-submitted answers for each of a first set of questions, a percentage corresponding to how many of the first set of user-submitted answers were correct answers; a second set of user-submitted answers for each of a second set of questions, and a third set of user-submitted answers corresponding to each of a third set of questions; input the data to the neural network; determine a predicted percent accuracy of each user based on the user-submitted answers to the first set of questions, the second set of questions, and the third set of questions; compare the predicted percent accuracy to the percentage; and adjust the determining of the predicted percent accuracy based on the comparing.

BRIEF DESCRIPTION OF THE DRAWINGS

The above and other aspects, features and advantages of several embodiments of the present invention will be more apparent from the following more particular description thereof, presented in conjunction with the following drawings.

Figure 1:
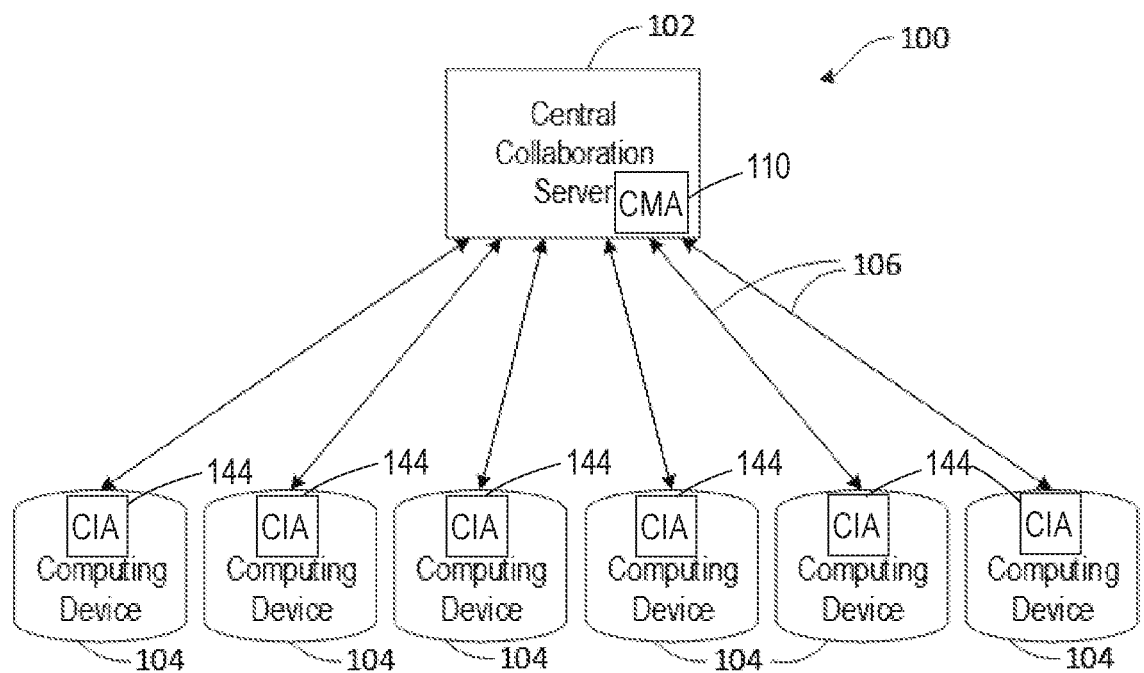
FIG. 1 is a schematic diagram of an exemplary real-time collaborative system.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

The following description is not to be taken in a limiting sense, but is made merely for the purpose of describing the general principles of exemplary embodiments. The scope of the invention should be determined with reference to the claims.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

As referred to in this specification, "media items" refers to video, audio, streaming and any combination thereof. In addition, the audio subsystem is envisioned to optionally include features such as graphic equalization, volume, balance, fading, base and treble controls, surround sound emulation, and noise reduction. One skilled in the relevant art will appreciate that the above cited list of file formats is not intended to be all inclusive.

As described herein, the massive connectivity provided by the Internet is used to create a real-time closed-loop collaborative consciousness (or emergent group-wise intelligence) by collecting real-time input from large numbers of people through a novel user interface and processing the collected input from that large number of users into a singular intent that can answer questions or otherwise take actions or convey will in real-time. The methods use intervening software and hardware to moderate the process, closing the loop around the disparate input from each of the many individual participants and the singular output of the group. In a preferred embodiment, each individual user ("participant") engages the user interface on a computing device, conveying his or her individual real-time will in response to a prompt such as a textually displayed (or audibly displayed) question as well as in response to real-time feedback provided to the user of the group's emerging real-time intent. This closes the loop around each user, for he is conveying individual intent while also reacting to the group's emerging intent. Thus each user must be able to see not only the prompt that begins a session, but the real-time group intent as it is forming. For example, if the intent is being conveyed as words, the user will see those words form, letter by letter. If the intent is being conveyed as a direction, the user sees the direction form, degree by degree. If the intent is being conveyed as a choice among objects, the user sees a pointer 406 get closer and closer to a particular chosen object. Thus, the user is seeing the group's will emerge before his eyes, reacting to that will in real-time, and thus contributing to it. This closes the loop, not just around one user, but around all users who have a similar experience on their own individual computing device. While the embodiments described generally refer to computing devices, it will be understood that non-computing devices, such as desktop computers, may also be used.

Real-time occurrences as referenced herein are those that are substantially current within the context of human perception and reaction.

Referring first to FIG. 1, a schematic diagram of an exemplary collaboration system 100 is shown. Shown are a Central Collaboration Server (CCS) 102, the plurality of computing devices 104, a plurality of exchanges of data 106 with the Central Collaboration Server 102, a collaboration mediation application (CMA) 110, and a collaborative intent application (CIA) 144.

Embodiments of the plurality of computing devices 104 and the interaction of the computing devices 104 with the system 100 are previously disclosed in the related patent applications.

As shown in FIG. 1, the system 100 comprises the Central Collaboration Server (CCS) 102 in communication with the plurality of computing devices 104, each of said computing devices 104 running the Collaborative Intent Application ("CIA") 144. The system 100 is designed to enable the plurality of users, each engaging an interface of one of said computing devices 104, to jointly control a single graphical element, for example the movable pointer 210, through real-time group-wise collaboration. In some embodiments, such as a multi-tier architecture, the computing devices 104 may communicate with each other. The CCS 102 includes the collaboration mediation application 110 running on the CCS 102 and additional elements as necessary to perform the required functions. In this application, it will be understood that the term "CCS" may be used to refer to the CMA 110 or other elements of the CCS 102 that are performing the given function.

Although multiple pointers controlled by multiple swarms is enabled by the innovations of the present invention, for the current discussion we will give examples that are confined to a single swarm. This is for simplicity of description and is not intended to limit the scope of the innovations.

Referring again to FIG. 1, each of the computing devices 104 comprises one or more processors capable of running the CIA routines and displaying a representation of the pointer 210 along with a plurality of graphical input choices 208. The computing device 104 could be, for example, a personal computer running the CIA application. It could also be a mobile device such as a smart phone, tablet, headset, smart-watch, or other computing device running the CIA 144. The CIA software code can be configured as a stand-alone executable or be code that executes inside a web-browser or other shell. An exemplary computing device architecture is described further below in FIG. 6

While FIG. 1 shows only six computing devices 104 in communication with the CCS 102, the system 100 is highly scalable, enabling hundreds, thousands, or even millions of users to connect simultaneously to the CCS 102, each using their own computing device 104, thereby sharing a real-time collaborative experience with the other users. In this way, large numbers of users can collaboratively control the pointer 210 to generate a response by selecting letters, words, or numbers as a group intelligence.

While FIG. 1 shows simple top-down architecture for direct communication between the CCS 102 and each of the computing devices 104, related application Ser. No. 14/708,038 entitled MULTI-GROUP METHODS AND SYSTEMS FOR REAL-TIME MULTI-TIER COLLABORATIVE INTELLIGENCE discloses multi-group and tiered architectures that enable shared processing loads among large numbers of computing devices 104. While FIG. 1 shows a dedicated CCS 102, the system 100 can be configured such that one of the computing devices 104 acts as the CCS 102 by running both CCS routines and CIA 144 routines. Such a model is generally viable only when the number of users is low. Regardless of the architecture used, each of said computing devices 104 that is engaged by a participating user includes one or more display devices for presenting a graphical user interface to the user.

Figure 2:
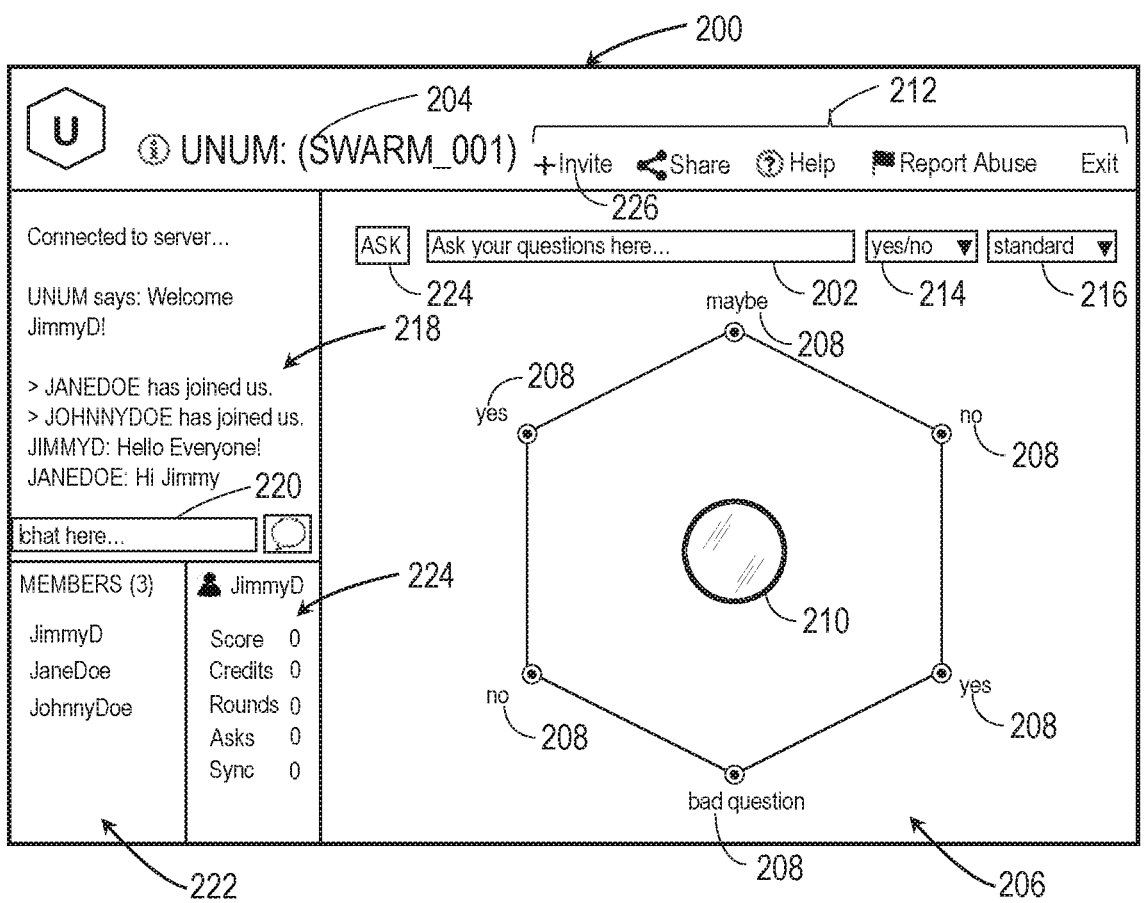
FIG. 2 is an exemplary display interface of a computing device of the collaborative system in accordance with one embodiment of the present invention.

Referring next to FIG. 2, an exemplary display interface 200 is shown in accordance with one embodiment of the present invention. Shown are a prompt bar 202, a group name 204, a target area 206, a plurality of input choices 208, the pointer 210, a communication menu 212, a board selection drop-down menu 214, a physics selection drop-down menu 216, a chat window 218, a chat input box 220, a current member list 222, a statistics display 224, an invite button 226, and an ask button 228.

The graphical pointer 210 is simultaneously displayed to each user by the CIA 144 running on his computing device 104. The pointer 210 displayed to each user appears in a substantially similar position with respect to a set of input choices 208 (as compared to the position of the pointer 210 on other user's screens). The synchrony of the interfaces is coordinated by the data 106 received by each computing device 104 sent from the CCS 102 over the communications link. In a current embodiment, data 106 is sent from the CCS 102 to each of the plurality of computing devices 104 at a rate of 60 updates per second, the data 106 including the current position of the graphical pointer 210 (also referred to as a puck) with respect to the set of graphical input choices 208, as further shown below.

In general, the input choices 208 are identically displayed upon all the computing devices 104, although some unique embodiments allow for divergent input choices 208. For example, in some embodiments the input choices 208 are displayed in the native language of each user, each input choice 208 conveying a substantially similar verbal message, but translated based on a language setting of the user. This feature enables swarms of individuals who may speak different languages and may be unable to communicate directly, to still form a swarm intelligence that can collaboratively answer questions or take actions. In such embodiments, the displayed questions are also automatically translated into the chosen native language of the user. This is also true of a displayed answer, and optionally the chat window 218 output.

In some embodiments, multiple graphical pointers 210 are displayed by the computing devices 104, each of said graphical pointers 210 being collaboratively controlled by a different group of users. For example, 500 users may be collaboratively controlling Graphical Pointer #1, while a different group of 500 users are collaboratively controlling Graphical Pointer #2. The first group of 500 users comprises a first swarm. The second group of 500 users comprises a second swarm. This unique system and methods allow for the first swarm to compete with the second swarm in a task that is displayed simultaneously to all 1000 users on each of their computing devices 104.

As shown in FIG. 2, the CIA software 144 running on each computing device 104 is configured to display a graphical display interface 200 that includes at least one graphical pointer 210 and the plurality of spatially arranged graphical input choices 208. In the example shown, the graphical pointer 210 is configured to look like a "glass puck" with a central viewing area that is transparent. In the example shown, the input choices 208 are configured as a hexagon of six input choices 208, each input choice 208 including a graphical icon (in the embodiment shown, a dot inside a circle) and an associated word. In this case, the six input choices 208 correspond with possible answers to questions: "Yes", "Maybe", "No", "Yes", "Bad Question", and "No". When the pointer 210 is positioned over one of the input choices 208 such that the input choice 208 is substantially within a centralized viewing area of the pointer 210 for more than a threshold amount of time, that input choice 208 is selected as a target. In common embodiments the threshold amount of time is 3 to 5 seconds. In the current embodiment, the centralized viewing area appears as a graphical etching on the glass pointer 210, the etching remaining invisible until the pointer 210 approaches a target.

As shown in the exemplary embodiment of FIG. 2, the spatially arranged graphical input choices 208 can comprise letters, numbers, words, and/or punctuation marks. The input choices 208 could also comprise photographs. In this example, if the pointer 210 is positioned over one of the six targets for more than the threshold amount of time, that input choice 208 is selected as the answer to a previously asked question.

To ask a question, the user enters the question into the prompt bar 202. Once entered, the user clicks the ask button 228, which sends the question from the CIA software 144 of that particular user (running on his computing device 104) to the CCS 102. Because many users could ask questions, the CCS 102 acts as the gate keeper, deeming the first question received (when no question is currently in process) as the one that will be asked to the group. In the current embodiment, not all users are enabled to ask questions at any given time to avoid too much competition for asking. In some embodiments, credits are redeemable by the user for the right to ask the question. In some embodiments, the user must spend credits to ask the question, and can only ask if he has enough credits. In some embodiments, users earn credits based on points awarded for participation in a session. More credits are awarded to users who have high sync scores, less credits being awarded to users with low sync scores. The methods for computing sync scores will be described in more detail further below.

In addition to asking questions, users can select from a plurality of possible target boards by using the board selection drop-down menu 214. The currently selected target board is for yes/no questions. Other target boards may include true/false questions, good/bad questions, and other sets of standardized answers. Also, a spelling board may be included where a full alphabet of input choices 208 are displayed, allowing users to spell out answers (as shown in co-pending applications). The spelling board may also include numbers, punctuation, backspace, blank space, and other alphanumeric characters.

As disclosed in co-pending applications, custom boards can also be entered by selecting "custom" from the board selection drop-down menu 214. As will be disclosed further below, "suggestion mode" can also be selected for a given question through the board selection drop-down menu 214.

As also shown in FIG. 2, users can selectively use a physics mode from the physics selection drop-down menu 216. As shown, a standard physics mode has been selected, but users can choose ice mode where the pointer 210 slides around on the target board as if it were frictionless ice. A gravity mode is configured to pull the pointer 210 back to a location substantially near a center of the input choice set (i.e. center screen) as if by simulated gravity. In a heavy mode the pointer 210 has substantially higher mass than in standard mode and thus is harder for users to collectively move. In a barrier mode, a set of physical barriers block a direct path to the input choices 208, forcing users to collaboratively guide the pointer 210 around barriers to reach the input choices 208.

As also shown in FIG. 2, the display interface 200 includes the chat window 218 that allows users to exchange messages by typing in the chat input box 220. Also included is the list of current members who are part of the group and thus enabled to ask questions and collaboratively provide control over the pointer 210.

Because users enter this group display interface 200 from a lobby display interface where the user can choose from among a plurality of available groups or swarms, the name of the current group (swarm) is also displayed. In addition, users can invite their friends to this group by clicking on the invite button 226 includes in the communication menu 212. In the current embodiments, these invites can leverage existing social networks such as Facebook® friends and Twitter® followers. Also included in the interface of the current embodiment is the statistics display 224 that gives the user of this instance of the software (on this computing device 104) a listing of his personal statistics including his score, credits, synchronicity value, the number of rounds he has participated in, and the number of questions he has asked the swarm.

When an exemplary question is entered by one of the users in the group, the question is sent by the CIA 144 on that user's computing device 104 to the CCS 102. If the CCS 102 software determines that the question is valid, the question is then sent to all the users in the group so that it appears substantially simultaneously on the display interface of each of the computing devices 104. In a current embodiment, the question appears in a large box at the top of the target board. Then a "3"-"2"-"1" countdown timer appears at the center of the target board, notifying users get ready for the collaborative answer process, or session, to begin. The display interface (having received instructions from the CCS 102) then displays a graphical "GO" and the users will then collaboratively control the motion of the pointer 210, guiding it towards whichever input choice 208 best satisfies the collaborative will of the group as emergent from the real-time swarm intelligence.

Each answer session is generally limited in total time by the underlying software of the present system 100, for example giving the swarm 60 seconds to converge upon an answer through the collaborative motion of the pointer 210. This time pressure is deliberate, for it inspires users to employ their gut instincts and intuitions rather than over-thinking the question.

To support the use of time-pressure, the countdown clock 304 is displayed on a group display interface 300 of each user (as shown below in FIG. 3), the timing of the plurality of countdown clocks 304 coordinated by handshaking signals from the CCS 102. If the pointer 210 does not reach the target within the allotted 60 seconds, the system 100 determines that the collaboration is a failure, and sends a failure indication to the CIA 144 of each computing device 104. In some embodiments, in response to receiving the failure indication the CIA 144 terminates user input and displaying the words "brain freeze!" on the group interface. In addition, in response to receiving the failure indication all users could lose a number of points and/or credits for the collective failure of the group to guide the pointer 210 to a target.

Figure 4:
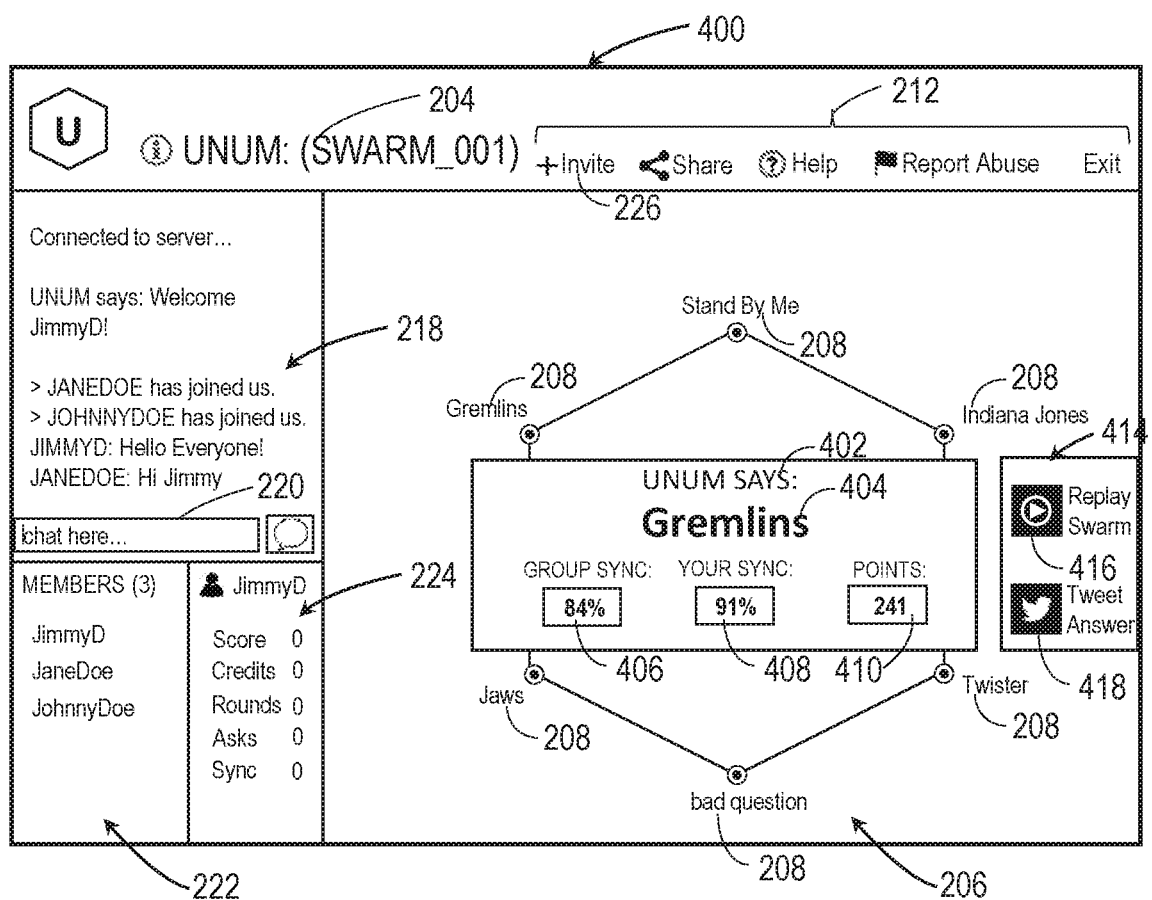
FIG. 4 is an exemplary group display interface of the computing device of the collaborative system after the collaboration session has been successfully completed.

The system 100 is configured to determine that a target is achieved when the group successfully positions the pointer 210 over one input choice 208 for more than the threshold period of time. When the group targets one input choice 208, the target is displayed on the computing devices 104 of all the users as the answer to the question. Also displayed may be statistics for that answer as shown below in FIG. 4, such as the group cohesiveness score and the user synchronicity value, as previously described in related application Ser. No. 14/708,038. Also displayed may be points and/or credits awarded for the current user's participation in the emergent answer, as shown in FIG. 4.

Figure 3:
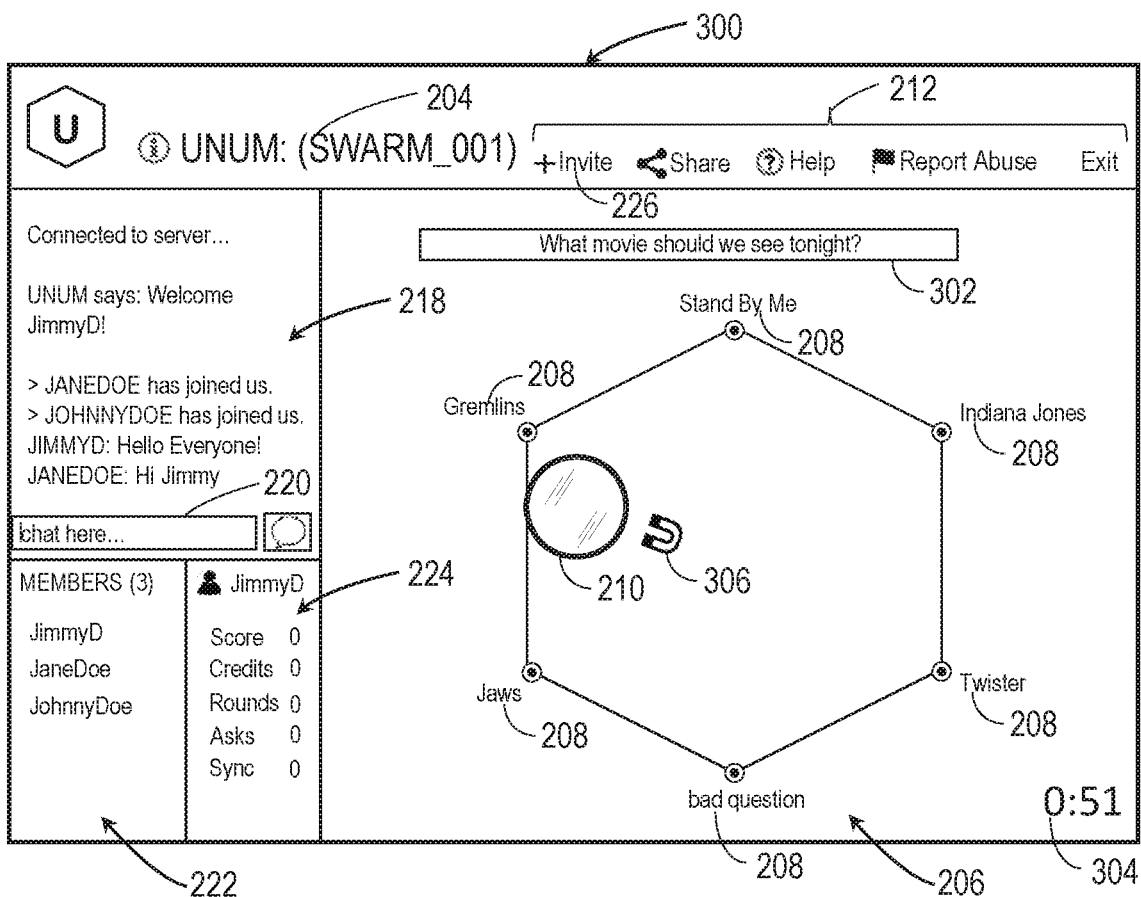
FIG. 3 is an exemplary group display interface of the computing device of the collaborative system at a point in time during a collaboration session.

Referring next to FIG. 3, shown is the exemplary group display interface 300 of one user at a point in time during a collaboration session, i.e. after the question has been received by the computing devices 104 but before the collaboration session has ended. Shown are the group name 204, the target area 206, the plurality of input choices 208, the pointer 210, the communication menu 212, the chat window 218, the chat input box 220, the current member list 222, the statistics display 224, the invite button 226, a question display 302, a countdown clock 304, and a magnet icon 306.

As shown in FIG. 3, the basic layout of the display interface 300 is similar to FIG. 2. In FIG. 3, in the target area 206 the prompt bar 202, the ask button 228, the board selection drop-down menu 214, and the physics selection drop-down menu 216 have been replaced by the question display 302. The question display 302 appears substantially simultaneously upon the screens of the computers of all users in the swarm. Also displayed on the target area 206 are the set of input choices 208 from which the users are being asked to collaboratively select from. In this case the question is—"What movie should we see tonight?" and the input choices 208 include five movie names: "Jaws", "Gremlins", "Stand By Me", "Indiana Jones", and "Twister" along with a sixth input choice 208, "Bad Question". In many embodiments, the Bad Question choice is automatically included in the input choices 208 by the CCS 102, allowing the swarm to collectively reject the question. This allows the group not to waste time on incoherent or undesirable questions.

After the question and input choices 208 appear on the display interfaces of the group members, the "3"-"2"-"1" countdown timer appears (not shown) to signal the start of the current session. When the session begins, the users are now enabled to provide user input to the pointer 210, guiding it towards one of the input choices 208. As the session time progresses, the 60 second countdown clock 304 counts down, applying time pressure to the group. In FIG. 3, the countdown clock 304 is shown at 0:51, indicating that 51 seconds remain in the current session. During the current session, group members may also be inputting messages via text using the chat window 218, and/or may be chatting with a simultaneously enabled group voice chat. This allows interpersonal communication during the session.

As disclosed in the co-pending applications which have been incorporated by reference, each user is enabled to apply forces upon the pointer 210 to convey his individual intent as to how the pointer 210 should move at any moment in time. The displayed motion of the pointer 210, however, is not a reflection of that user's individual input but a reflection of the collectively combined group input from the entire swarm of users. As disclosed in co-pending applications, the collective input from the plurality of users can be such that each user's input imparts an equally weighted contribution to the total force applied to the pointer 210. In some embodiments, weighting factors are used to give the input force from some users a higher contribution as compared to other users. As will be described later in this document, novel methods of adjusting the weighting factors have been developed such that computational configuration of swarms can be dynamically changed over time by the underlying software running on the CCS 102, optimizing the collaborative performance of a given group based on the historical performance of its members.

As disclosed in the co-pending applications which have been incorporated by reference, each user is enabled to apply forces upon the pointer 210 using one of a variety of innovative methods. In one preferred embodiment, disclosed in application Ser. No. 14/473,768, each user controls the graphical magnet icon 306 by manipulating a mouse, touchpad, touchscreen, tilt interface, or other provided user-interface method. In one such embodiment, as the user moves his mouse cursor within a threshold distance of the pointer 210, it turns into the magnet icon 306 that grows larger in size, the closer to the pointer 210 the mouse is positioned. The larger size indicates a larger force. The relative position of the magnet icon 306, which always orients itself towards a center of the pointer 210 under software control, indicates the direction of pull that user wants to impart on the pointer 210. In this way, a user can intuitively impart of force of a selectable magnitude and direction upon the pointer 210.

In other embodiments, the user can tilt the computing device 104 to convey a desired magnitude and direction. In such embodiments, the magnet icon 306 or other graphical indicator is displayed to indicate the imparted force. In some such embodiments, the user must also tap the screen while tilting the computing device 104, the frequency of the taps causing a higher force to be applied. This unique use of a combined tilt and tap methodology is highly effective, for it enables one handed input from users on small mobile devices. It also enables the ease of tilting, but avoids it feeling too passive by also requiring frequent tapping. In many such embodiments, the maximum force is applied for only a short time following each tap (for example 0.5 seconds) and then fades away over a subsequent period of time (for example 3 to 5 seconds). The displayed magnet icon 306 shrinks and fades away along with the force magnitude. This is a highly intuitive interface and requires that a user repeatedly tap to maintain a maximally applied force upon the pointer 210. This is an innovative implementation, for it has been found that requiring frequent tapping better engages the user in the collaborative experience when the tilt interface is used.

In other embodiments the user is enabled to swipe across a touchscreen display to indicate the magnitude and direction of the force the user desires to apply to the pointer 210. In many such embodiments the magnet icon 306 is displayed, indicative of the magnitude and direction conveyed by the swipe. In such embodiments, the swipe force is applied for only a short time (for example 0.5 seconds) and then fades away over a period of time (for example 3 to 5 seconds). The magnet shrinks and fades away along with the force magnitude. This is a highly intuitive interface and requires that the user repeatedly swipe the screen to maintain a maximally applied force upon the pointer 210. This is an innovative implementation, for requiring frequent and repeated swipes better engages the user in the collaborative experience when the swipe interface is used.

As disclosed in the co-pending applications, the CCS 102 software collects input from the plurality of users, computes a resultant motion of the pointer 210, and communicates the resultant motion of the pointer 210 to each CIA 144 of the plurality of computing devices 104. The CCS 102 software also determines if the pointer 210 location is successfully targeting one input choice 208 for more than the threshold amount of time. If so, the CCS 102 software determines that the question is answered and communicates the targeted input choice 208 to all members of the group such that it is substantially simultaneously displayed upon the display interface of each computing device 104 included in the group.

In this way, the system 100 of the present invention enables groups of networked users to collaboratively control the graphical pointer 210 in response to one or more questions posed by members of group. More specifically, embodiments of the current system 100 enable each of the plurality of users to view on a screen of their own individual computing devices 104, a representation of the pointer 210 and the target board, and enable each of said users to convey the user intent (also referred to as the user intent value) as to the desired direction (and optionally magnitude) of motion that user wants the pointer 210 to move so as to select one of the input choices displayed on the target area. The user intent is represented as a user intent vector. The user intent vector can be conveyed by the user, for example, by tilting his computing device 104 in the desired direction, swiping the screen in a desired direction, or positioning the mouse such that the graphical magnet icon 306 pulls on the pointer 210 with a desired direction.

In some embodiments, eye tracking hardware and software are included in the computing device 104, for example the eye tracking hardware and software disclosed in U.S. Pat. No. 7,429,108 to the present inventor. The CIA 144 is configured to operate the eye tracking hardware and software and receive input from the eye tracking hardware are software. In the current innovation, a user's gaze is tracked by the CIA 144 and used to compute the user intent vector that represents the user's desired motion of the pointer 210, which is communicated to the CCS 102 software. More specifically, the user's gaze defines a location with respect to the pointer 210. The vector between the location and the center of the pointer 210 is then used by the CIA 144 to compute the magnitude and direction of the user intent vector. In this way, the user can simply look towards a direction that he desires the pointer 210 to move, and the user intent vector is computed by the CIA 144 and sent to the CCS 102 software by the CIA 144. In some instances the magnet icon 306 or other graphical element is displayed to represent the user intent vector on the display. In this way, the user can participate in the collaborative swarm intelligence experience using a hands-free method.

In some embodiments, a brain-computer interface (sometimes called a mind-machine interface, direct neural interface, synthetic telepathy interface, or a brain-machine interface), is employed to collect the user input of one or more users in the swarm. In some such embodiments, the user's brain-waves are detected by the brain-computer interface as he or she watches the pointer 210 move upon his screen. A calibration session is often required to correlate detected brain activity with a desired direction of motion of the pointer 210, but once that calibration is complete, the brain-computer interface system can be used by the CIA 144 to compute the user intent vector that represents that user's desired motion of the pointer 210 at each time-step during the session, this user intent vector being communicated to the CCS 102 software. In this way, the user can simply think about a direction that he desires the pointer 210 to move, and the user intent vector is computed and sent to the CCS 102 software by the CIA 144. In some instances the magnet icon 306 or other graphical element is displayed to represent the user intent vector on the screen of the user's computing device 104. In this way, the user can participate in the collaborative swarm intelligence using a hands-free method.

Whatever the input method used (mouse, touchscreen, tilt, eye-tracking, or brain-tracking), the system is configured such that the user intent vector is communicated by the CIA 144, running on the user's computing device 104, to the Central Collaboration (CCS) 102. The CCS 102 collects the user intent vectors from the plurality of users (via their separate computing devices 104), and then derives a group intent vector that represents the collective will of the group at that time. The group intent vector is then used to compute an updated location of the pointer 210 with respect to the target area and the input choices 208, the updated location reflecting the collective will of the group.

In many preferred embodiments, a physical model is employed in which the pointer 210 is assigned a simulated mass and damping, each user input represented as a simulated force vector. In some such embodiments, the mass and damping of the pointer 210 is adjusted dynamically by the software depending upon a physics mode selected by the user who asks each question by using the physics selection drop-down menu 216 shown in FIG. 2. In some such embodiments, the ice mode can be selected by the user in which the pointer 210 glides very freely as if on ice. In some such embodiments, the heavy mode can be selected by the user in which the pointer 210 requires the collaborative pull of a large majority of members of the swarm to achieve any real velocity. In some embodiments, the mass and damping are dynamically assigned by the software on the CCS 102 depending upon the current size of the swarm, the larger the swarm the higher the mass and higher the damping assigned.

Whether a physics model is used or not, the updated pointer 210 location is then sent by the CCS 102 to each of the computing devices 104 and is used by the CIA 144 running on each of said computing devices 104 to update the displayed location of the pointer 210. In this way, the plurality of users can watch the pointer 210 move, not based on their own individual input, but based on the overall collective intent of the group.

As described in related U.S. patent application Ser. No. 14/668,970, the group intent vector can be computed from the plurality of user intent vectors as a simple average, or may be computed as a weighted average in which some users have more influence on the resulting collective group intent than other users. In such embodiments, the weighting of each user can be derived based on user scores and/or user synchronicity values (also referred to as synchrony values) earned during prior interactions with the system 100. In such embodiments, each user may be assigned one or more variables that represents how his or her input should be weighted with respect to other users in the swarm. In some embodiments the variable is called the user contribution index and is updated regularly to reflect the skill of that user in providing input that helps the group reach a coherent collaborative response. The user who demonstrates a history of "constructive input" (i.e. input that is supportive of the collective intent, will be assigned a higher user contribution index than the user who has demonstrated a history of "destructive input" (i.e. input that is substantially resistant to the collective intent). In this way, users are incentivized push for collaborative consensus.

Those users who are supportive to the emerging consensus are determined computationally by the CCS 102 by repeatedly comparing each user's user intent vector with the group intent vector. The more aligned that user's user intent vector is with the direction of the group intent vector, the more collaborative that user is behaving. The further the user intent vector is from the direction of the group intent vector, the less collaborative the user is behaving. This level of collaboration is represented by the value defined herein and in the related applications as the user's synchrony (or synchronicity). The synchronicity value may be an instant synchronicity value, i.e. one at a certain instant in time, or may be a session synchronicity value representing the overall user synchronicity for one or more sessions.

The synchronicity value for each individual user is determined by the CCS 102 by repeatedly comparing the user intent received from each computing device 104 (representing the user input reflecting the user's intent to move the graphical object of the pointer 210 in a given direction) with the group intent derived from all user intents. The synchronicity value of the individual user is determined but computing the difference between the user intent and the group intent. The synchronicity value may be an instant value, i.e., based on a single comparison of the user intent to the group intent at one point in time, or may be synchronicity value over a specific period of time, e.g. an average of the synchronicity values over that period. Thereby, the user synchronicity value each individual user represents at least in part that user's contribution to the collaborative control of the at least one graphical object.

In some embodiments, each individual's synchrony value ranges between an upper bound value and a lower bound value. In one embodiment, the synchronicity value ranges between +1 to −1, with the value +1 (the upper bound) being assigned when the user intent vector is substantially aligned with the group intent vector, and with the value of −1 (the lower bound) being assigned when the user intent vector is substantially in the opposite direction of the group intent vector, with all values between +1 and −1 being used to represent varying degrees of alignment. For example, if the user intent vector is 90 degrees out phase with the group intent vector, a value of 0 is assigned, for that is halfway between fully convergent and fully divergent. Thus, a skilled user is one who is able to convey his individual intent as input, but do so in a cooperative manner. Such a user will maintain a positive synchrony value during much of the session, for he or she is being supportive of the group intent. A user who maintains a positive value will be awarded more points and be assigned a higher user contribution index than a user who does not.

In some embodiments, the user's synchronicity values are computed as a percentage from 0% to 100%, for that is often an easier metric for users to understand. The session synchronicity value of 100% means the user has been perfectly in sync with the swarm. The session synchronicity value of 0% means the user has been entirely out of sync with the swarm. Session synchronicity values between 0% and 100% reflect relative synchronization with the swarm, with a 50% synchronicity value meaning the user was neutral with respect to the swarm. This is described in more detail later in this document.

In some embodiments, an average (or mean) synchronicity value is computed for the user over some number of prior questions. For example a "sync_5" synchronicity value can be computed as that user's average synchronicity value over the last five sessions. This is a highly useful value for it indicates how cooperative the user has been over a recent period of time. The "sync_5" synchronicity value can be used in combination with other time-histories, such as a "sync_50" synchronicity value which indicates the average synchronicity value for that user over the last 50 sessions, in order to compute that user's weighting value in the swarm. In some embodiments, the mean synchronicity value may be time-weighted such that time steps near the end of the session time period are more heavily weighted than time steps near the start of the time period.

In some embodiments, the CCS 102 determines at least one user assessment based at least in part upon one of more user synchronicity values. For examples, one assessment may be configured to determine whether the user is categorized as "flexible" or "entrenched". In another example, one assessment may be configured to determine whether the user is "constructive" or "destructive".

Referring next to FIG. 4, shown is an exemplary display interface 400 as displayed on the computing device 104 being used by one user of a group, shown at a moment in time after the group has successfully positioned the pointer 210 on one of the input choices 208, selecting the input choice 208 as the target, thereby collaboratively choosing the answer. Shown are the group name 204, the target area 206, the plurality of input choices 208, the communication menu 212, the chat window 218, the chat input box 220, the current member list 222, the statistics display 224, the invite button 226, a prefix text 402, a target text 404, a group cohesiveness score indication 406, a session synchronicity value score indication 408, a points indication 410, an answer window 412, an answer options tab 414, a replay swarm icon 416, and a Tweet answer icon 418.

In this instance, the target is "Gremlins", reflecting the swarm's collaborative will in response to the posed question: "What movie should we see tonight?" As shown in FIG. 4, the target is graphically displayed to each user on the screen of his or her computing device 104 (as controlled by the CIA software 144 running on that device 104). In the embodiment shown, the graphical display includes the answer window 412 including the prefix text 402 "UNUM says:" along with the chosen target: "Gremlins".

In some embodiments, the answer is also displayed in the chat window 218, as if communicated by the personified entity "UNUM" itself. This gives the swarm intelligence a feeling of personality and presence.

Also displayed in the answer window 412 is one or more statistics computed by the CCS 102 software. The statistics may reflect the performance of the group as a whole or reflect the performance of the particular user of that computing device 104. In this example, the group cohesiveness score indication 406, reflecting the synchronicity of the group, is shown of 84%, which indicates that the group was 84% aligned in their imparted motion of the pointer 210. The group cohesiveness score indication 406 includes the text "GROUP SYNC:" The group cohesiveness score of 84% shows strong convergence of group members, reflecting that the swarm intelligence spoke with high "conviction" when answering this question. A low group cohesiveness score would reflect a low conviction for the swarm intelligence. In some embodiments the group cohesiveness score may be repeatedly reported to and repeatedly displayed by each of the computing devices 104, for example during the session.

Related application Ser. No. 14,708,038 discloses some methods of computing the group cohesiveness score, such as to compute a running average of the absolute value (i.e. magnitude) of the group intent vector over time. The group cohesiveness score may have an upper bound and a lower bound, wherein a group cohesiveness score at the upper bound indicates that the plurality of real-time user intents are substantially aligned with each other, and a group cohesiveness score at the lower bound indicates that the plurality of real-time user intent values are substantially misaligned with each other. In one embodiment, the lower bound is essentially 0, as the summation of the user intent vectors, being opposite (exactly misaligned), cancel each other out.

In some embodiments, the CCS 102 determines at least one group assessment based at least in part upon one of more group cohesiveness scores. For examples, one assessment may be configured to determine whether the group is categorized as "flexible" or "entrenched".

The group cohesiveness score may be repeatedly calculated by the CCS 102 during the session and repeatedly received by each of the computing devices 104.

In another embodiment, the real-time user intent values are determined to be substantially aligned with each other (i.e. at or near the upper bound) when their vector directions are substantially the same in at least a plane. The real-time user intent values are determined to be substantially misaligned with each other (i.e. at or near the lower bound) when a summation of their vector directions substantially cancel each other out, resulting in a near zero resultant.

Also displayed in the answer window 412 is the session user synchronicity value score indication 408. The session user synchronicity value is a statistical indication of how well the particular user of this computing device 104 was aligned in his input with the swarm as a whole. The session synchronicity value score indication 408 includes the text "YOUR SYNC:" and value of 91%. In this case, the user was very highly aligned, achieving a 91% synchronicity value.

Also displayed in the answer window 412 is the points indication 410, indicating the number of points earned by this user as a result of his or her participation during the session. The user in this session has earned 241 points, as shown in the points indication 410. The points indication 410 also includes the text "POINTS:"

Users earn more points (or credits) as a result of being constructively collaborative, helping the swarm reach a meaningful consensus. Users earn less points (credits) as a result of being non-collaborative (obstructive), blocking the swarm from finding a meaningful consensus. In the case where the swarm cannot answer a question within the allotted time because consensus is never reached, all users lose points (credits). This innovative scoring method encourages participants to be collaborative rather than obstructionist, thereby improving the performance of the swarm intelligence. This imposes a philosophical situation often referred to as a Prisoner's Dilemma and structures it uniquely such that group collaboration and consensus trumps group stagnation and entrenchment. In this way, the present invention helps groups to find common ground.

Also displayed is the answer options tab 414 which gives users options related to the answer that was just reached by the swarm. The user can selectively Tweet® the answer by selecting the Tweet answer icon 418. This triggers a routine within the CIA 144 that sends a Tweet request to the CCS 102 software, which then sends an automated Tweet to Twitter. The Tweet includes the question and the selected answer. The Tweet also includes a numerical indication of the number of users who participated in answering the given question, thus conveying the size of the swarm intelligence which produced this Tweet. The Tweet also includes a hashtag, for example "# UNUMsays", as well as an indication of the group cohesiveness score. In this way, the swarm intelligence system comprised of dozens, hundreds, or even thousands of individual minds working as one can is given a unique voice as a social media entity. Enabling collaborative groups to ask questions, answer questions, and voice the swarm's collaborative intent over Twitter as a unique entity is highly unique and appealing to users. In some embodiments, the decision to Tweet an answer is posed by the software to the swarm. A question appears, e.g. "Should we tweet this?", and a set of answers appear "yes", "no", etc. If the group picks "yes" or an equivalent, the swarm intelligence has decided to send its own Tweet. In this way, the invention described herein enables the formation of a swarm intelligence, enables that swarm intelligence to answer questions, enables that swarm intelligence to consider the answer that emerges and decide if that swarm intelligence wants to Tweet the answer publically.

As also included in the answer options tab 414, each individual user can select a replay swarm icon 416. Upon selection of the replay swarm icon 416, the session resulting in the current answer is replayed on the display. The session replay is unique in that it displays an indication of the input of all users in the group at the same time (i.e. the swarm input), giving insight into how the swarm converged upon the collective answer. The video of the swarm input is displayed in high speed (generally 2× to 5× the speed of the real session). This saves time while also conveying a more intuitive display of swarm activity, for the high speed motion of the swarm input indicates the central tendencies more effectively than a real-time display.

Figure 5:
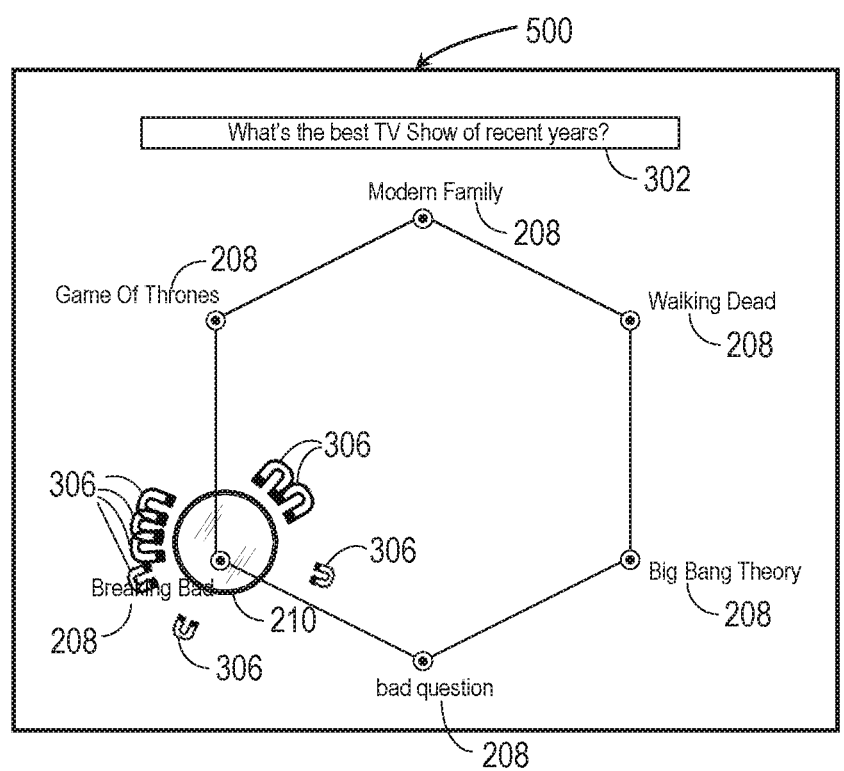
FIG. 5 is a frame of an exemplary collaboration session replay video.

Referring next to FIG. 5, a frame of an exemplary session replay video 500 is shown. Shown are the target area 206, the plurality of input choices 208, the question display 302, and the plurality of magnet icons 306.

As shown in FIG. 5, the session replay includes the question asked, the input choices 208, and the graphical indication of the trajectory taken by the pointer 210 during the answer period. Also displayed is the graphical indication of the input provided by each user of the swarm at each time-step during the answer session. In this instance, the graphical magnet icon 306 is displayed for each user, the size and orientation of each magnet icon 306 with respect to the pointer 210 indicating the magnitude and direction of that user's user intent vector (magnitude and direction) upon the pointer 210 at each given moment in time. In this example, 8 users were participating in the swarm, collaboratively moving the pointer 210 to an answer. This method is scalable to much larger numbers of users.

In some embodiments where hundreds or even thousands of users are participating at the same time, other innovative methods are employed to make the replay coherent. In one such embodiment, when the number of magnet icons 306 exceeds a threshold, they are grouped and averaged, for example showing one composite magnet icon 306 to represent every group of 10 in the swarm. In this way, a swarm with 800 users can be represented by a replay display of 80 magnet icons 306. This is highly informative to the user, conveying the central tendency of the swarm without overwhelming the display with too many magnet icons 306 (or other graphical indicators). In some embodiments, the user can select the replay speed. In some embodiments, the software running on the local user's computing device 104 can be configured to show all magnet icons 306 in the replay as a uniform color except for the magnet icon 306 representing the time-history of that particular user's input. For that user, the magnet icon 306 can be shown as an alternate color with visual contrast. In this way, the user can observe the swarm of many magnet icons 306 as the history of the session is replayed and identify his or her own magnet icon* among the swarm of many magnet icons 306 because his own magnet icon 306 is displayed in the alternate color. To enable this, the local software on each computing device 104 is configured to identify which magnet icon 306 in the replay is associated with the user of that computing device 104. Such identification can be achieved by associating each magnet icon 306 in the replay with a unique user ID value stored in memory.

As disclosed herein, the present invention employs a number of inventive systems and/or methods for dynamically modifying the configuration of the group to optimize the performance of that group over time. More specifically, each group is a collection of intelligent members (users) that are networked together in real-time, each of them providing collaborative input that's numerically combined into a singular intelligent output. To optimize the performance of a given group, a number of approaches have been developed, which can be used alone or in combination.

A first approach is to dynamically modify the swarm population by purging the swarm of one or more of its currently low-performing members (the input from said members determined to be substantially out of sync with collaborative will of the swarm, i.e. having a low synchronicity value) and/or setting a statistical threshold associated with a given group that bars non-compatible and/or low-performing members from joining that given group. These techniques modulate the make-up the group in real time, by filtering the addition of new members and/or moderating the ejection of low-performing members, all with the goal of maintaining a group configuration that behaves with high levels of collaboration.

A second approach is to dynamically modify the connection strengths within a given group population by adjusting the weighting assigned to the inputs from each individual user, the weightings assigned to each given user being modulated to improve overall group performance. More specifically, the CCS 102 software is selectively configured to increase the weighting of inputs from high-performing members of the group in terms of their collaborative behavior, and decrease the weightings of inputs from low-performing members of a swarm in terms of their collaborative behavior.

In order for the CCS 102 to purge users from the group, institute thresholds that limit entry into the group, and/or dynamically modify the connection strengths within the group, the CCS 102 must quantify swarm performance as well as user performance in the context of collaboration, for determining levels of collaborative performance is used as the basis for dynamic modulation of the group. To perform such quantification, the group cohesiveness score (representing the group synchrony) and the user synchronicity value (synchrony value) is used.

In the context of the collaborative swarming inventions disclosed herein, and as disclosed in the related applications, "synchrony" is defined as a statistical measure of collaboration within and among members of a real-time networked swarm. More specifically, "synchrony" is determined computationally by the software running on the CCS 102 based on the degree of alignment (in direction and magnitude) among the user input collected from all member of a swarm during a response. Because the degree of alignment changes at every time-step, the software running on the CCS 102 is configured to integrate over the response period, producing time-weighted average. In this way, the synchrony computed during a single question/answer session is the time-weighted average of the instantaneous synchrony (i.e. alignment among input vectors) across all time steps.

Further, the two types of synchrony are computed by the CCS 102 software and communicated to each of the peers: group synchrony and individual synchrony. These are described in detail as follows:

As previously disclosed in application Ser. No. 14/708, 038, the group cohesiveness score is an indication of the collaborative coordination of the group as it answers a question or completes a task, derived by computing the degree of alignment among the full set of user intent vectors from all participating users in the group, integrated across all time steps of the session. In many current embodiments, this value is expressed as a percentage between 0% and 100%. In many embodiments, the computation is configured such that if, in theory, all of the users of a group coordinate perfectly during the session (i.e. all users impart input vectors of the exact same magnitude and direction at every time step across the session), that group would deemed to have a group cohesiveness score of 100%. In practice, this rarely happens. Ideally, the outcome of the session is one where the central tendency of the group leads to a coherent answer through the motion of the pointer 210. This generally translates into a group cohesiveness score between 65% and 90%. Conversely, if all members of the group are pulling in the exact opposite directions (i.e. all user intent vectors perfectly cancel out), the pointer 210 will not move at all, resulting in a stalemate. This translates into the group cohesiveness score of 0%. In practice, this too rarely happens. That said, the inventive system still identifies unproductive swarms where the pointer 210 sputters, moving in one direction and another, but never finds enough consensus to drive the pointer 210 to the answer. Such sessions generally have the group cohesiveness score of between 10% and 35%.

Thus, an effective group will have the high group cohesiveness score (>65%), while an ineffective group, unable to converge on answers will have the low group cohesiveness score (<35%). Groups with the group cohesiveness score of around 50% will generally converge on coherent answers, but the group's "conviction" in those answers will not be as strong as sessions with the higher group cohesiveness score. To encourage convergent groups, the CCS 102 software is configured to measure and report the group cohesiveness score to every user after every session (i.e. every collaborative answer). By giving users a direct and easy to understand measure of the collaborative coherence of the group, they can understand if the group is performing well together and adapt their actions accordingly. Further, when points (or credits) are awarded to members of the group, the points are scaled by group cohesiveness score. Thus all users are rewarded when the group shows high synchrony (i.e. strong collaboration) by having a high group cohesiveness score, for they were able to converge on an answer with high conviction. By rewarding individual members for the level of cooperation achieved across the group, all users are incentivized to seek common ground, guiding the pointer 210 to the answer that best satisfies the collaborative will of the entire group. This is a very powerful and important method of driving coherent group.

Of course some users may be deliberately divergent, while other users will be contributing greatly to the overall cohesion of the swarm. To quantify these differences, we compute the user synchronicity value for every user. Like the group cohesiveness score indicating the degree of group synchrony, the user synchronicity value is a time-weighted average that's integrated across all time steps, but in this case the synchronicity value is a measurement of how well aligned a single user is with respect to the group as a whole. Because the synchronicity value is personalized for each user, the CCS 102 software must compute the user synchronicity value independently for each member in the group, indicating how well aligned that user's input vector was with the overall group input vector. The user with the high synchronicity value (>65%) during the session is deemed to have been highly supportive of the resulting consensus, contributing to the emergent response. Conversely, the user with the low synchronicity value (<35%) during the session is deemed by the software to be obstructionist, standing in the way of compromise and consensus.

To encourage constructive behavior from participants, the CCS 102 software measures and reports each user synchronicity value after each session sending each user their personal user synchronicity value for display on their own computing device 104. In addition, when points (or credits) are awarded to the user, the number of credits or points is based at least in part on that user's user synchronicity value and/or the group cohesiveness score. In some current embodiments of the invention, user points (or credits) are awarded based 60% on that user's user synchronicity value and 40% on the overall group cohesiveness score. In this way, users are incentivized to perform collaboratively as individuals, while also being incentivized to push the swarm to behave collaboratively overall. This is highly effective.

Figure 6:
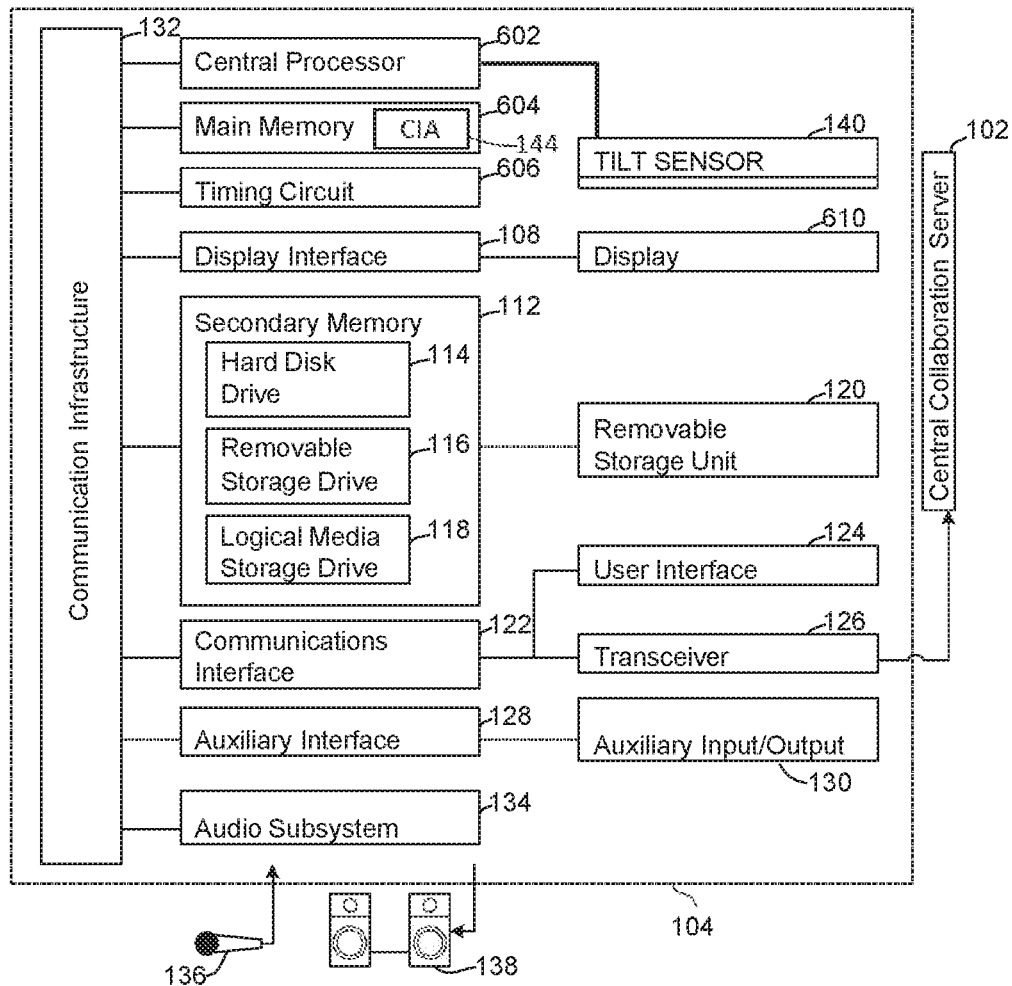
FIG. 6 is a schematic diagram of a computing device in accordance with one embodiment of the present invention.

Referring next to FIG. 6, a schematic diagram of a computing device 104 in one embodiment of the collaboration system is shown. Shown are a central processor 602, a main memory 604, a timing circuit 606, a display interface 108, a display 610, a secondary memory subsystem 112, a hard disk drive 114, a removable storage drive 116, a logical media storage drive 118, a removable storage unit 120, a communications interface 122, a user interface 124, a transceiver 126, an auxiliary interface 128, an auxiliary I/O port 130, communications infrastructure 132, an audio subsystem 134, a microphone 136, headphones 138, a tilt sensor 140, the central collaboration server 102, and the collaborative intent application 144.

As shown previously in FIG. 1., each of a plurality of computing devices 104, each used by one of a plurality of users (the plurality of users also referred to as a group), is networked in real-time to the central collaboration server (CCS) 102. In some embodiments, one of the computing devices 104 could act as the central collaboration server 142. For the purposes of this disclosure, the central collaboration server 142 is its own computer system in a remote location, and not the computing device 104 of one of the users. Hence the collaboration system is comprised of the centralized central collaboration server 142 and the plurality of computing devices 104, each of the computing devices 104 used by one user.

The computing device 104 may be embodied as a handheld unit, a pocket housed unit, a body worn unit, or other portable unit that is generally maintained on the person of a user. The computing device 104 may be wearable, such as transmissive display glasses.

The central processor 602 is provided to interpret and execute logical instructions stored in the main memory 604. The main memory 604 is the primary general purpose storage area for instructions and data to be processed by the central processor 602. The main memory 604 is used in the broadest sense and may include RAM, EEPROM and ROM. The timing circuit 606 is provided to coordinate activities within the computing device 104. The central processor 602, main memory 604 and timing circuit 606 are directly coupled to the communications infrastructure 132. The central processor 602 may be configured to run a variety of applications, including for example phone and address book applications, media storage and play applications, gaming applications, clock and timing applications, phone and email and text messaging and chat and other communication applications. The central processor 602 is also configured to run at least one Collaborative Intent Application (CIA) 144. The Collaborative Intent Application 144 may be a stand-alone application or may be a component of an application that also runs upon other networked processors.

The computing device 104 includes the communications infrastructure 132 used to transfer data, memory addresses where data items are to be found and control signals among the various components and subsystems of the computing device 104.

The display interface 108 is provided upon the computing device 104 to drive the display 610 associated with the computing device 104. The display interface 108 is electrically coupled to the communications infrastructure 132 and provides signals to the display 610 for visually outputting both graphics and alphanumeric characters. The display interface 108 may include a dedicated graphics processor and memory to support the displaying of graphics intensive media. The display 610 may be of any type (e.g., cathode ray tube, gas plasma) but in most circumstances will usually be a solid state device such as liquid crystal display. The display 610 may include a touch screen capability, allowing manual input as well as graphical display.

Affixed to the display 610, directly or indirectly, is the tilt sensor 140 (accelerometer or other effective technology) that detects the physical orientation of the display 610. The tilt sensor 140 is also coupled to the central processor 602 so that input conveyed via the tilt sensor 140 is transferred to the central processor 602. The tilt sensor 140 provides input to the Collaborative Intent Application 144, as described later. Other input methods may include eye tracking, voice input, and/or manipulandum input.

The secondary memory subsystem 112 is provided which houses retrievable storage units such as the hard disk drive 114 and the removable storage drive 116. Optional storage units such as the logical media storage drive 118 and the removable storage unit 118 may also be included. The removable storage drive 116 may be a replaceable hard drive, optical media storage drive or a solid state flash RAM device. The logical media storage drive 118 may be a flash RAM device, EEPROM encoded with playable media, or optical storage media (CD, DVD). The removable storage unit 120 may be logical, optical or of an electromechanical (hard disk) design.

The communications interface 122 subsystem is provided which allows for standardized electrical connection of peripheral devices to the communications infrastructure 132 including, serial, parallel, USB, and Firewire connectivity. For example, the user interface 124 and the transceiver 126 are electrically coupled to the communications infrastructure 132 via the communications interface 122. For purposes of this disclosure, the term user interface 124 includes the hardware and operating software by which the user executes procedures on the computing device 104 and the means by which the computing device 104 conveys information to the user. In the present invention, the user interface 124 is controlled by the CIA 144 and is configured to display information regarding the group collaboration, as well as receive user input and display group output. The CIA 144 is described in more detail below in FIG. 3.

To accommodate non-standardized communications interfaces (i.e., proprietary), the optional separate auxiliary interface 128 and the auxiliary I/O port 130 are provided to couple proprietary peripheral devices to the communications infrastructure 132. The transceiver 126 facilitates the remote exchange of data and synchronizing signals between the computing device 104 and the Central Collaboration Server 142. The transceiver 126 could also be used to enable communication among a plurality of computing devices 104 used by other participants. In some embodiments, one of the computing devices 104 acts as the Central Collaboration Server 142, although the ideal embodiment uses a dedicated server for this purpose. In one embodiment the transceiver 126 is a radio frequency type normally associated with computer networks for example, wireless computer networks based on BlueTooth® or the various IEEE standards 802.11.sub.x., where x denotes the various present and evolving wireless computing standards. In some embodiments the computing devices 104 establish an ad hock network between and among them, as with a BlueTooth® communication technology.

It should be noted that any prevailing wireless communication standard may be employed to enable the plurality of computing devices 104 to exchange data and thereby engage in a collaborative consciousness process. For example, digital cellular communications formats compatible with for example GSM, 3G, 4G, and evolving cellular communications standards. Both peer-to-peer (PPP) and client-server models are envisioned for implementation of the invention. In a third alternative embodiment, the transceiver 126 may include hybrids of computer communications standards, cellular standards and evolving satellite radio standards.

The audio subsystem 134 is provided and electrically coupled to the communications infrastructure 132. The audio subsystem 134 is configured for the playback and recording of digital media, for example, multi or multimedia encoded in any of the exemplary formats MP3, AVI, WAV, MPG, QT, WMA, AIFF, AU, RAM, RA, MOV, MIDI, etc.

The audio subsystem 134 in one embodiment includes the microphone 136 which is used for the detection and capture of vocal utterances from that unit's user. In this way the user may issue a suggestion as a verbal utterance. The computing device 104 may then capture the verbal utterance, digitize the utterance, and convey the utterance to other of said plurality of users by sending it to their respective computing devices 104 over the intervening network. In this way, the user may convey a suggestion verbally and have the suggestion conveyed as verbal audio content to other users. It should be noted that if the users are in close physical proximity the suggestion may be conveyed verbally without the need for conveying it through an electronic media. The user may simply speak the suggestion to the other members of the group who are in close listening range. Those users may then accept or reject the suggestion using their portable electronic devices 100 and taking advantage of the tallying, processing, and electronic decision determination and communication processes disclosed herein. In this way the present invention may act as a supportive supplement that is seamlessly integrated into a direct face to face conversation held among a group of users.

For embodiments that do include the microphone 136, it may be incorporated within the casing of the computing device 104 or may be remotely located elsewhere upon a body of the user and is connected to the computing device 104 by a wired or wireless link. Sound signals from microphone 136 are generally captured as analog audio signals and converted to digital form by an analog to digital converter or other similar component and/or process. A digital signal is thereby provided to the processor 602 of the computing device 104, the digital signal representing the audio content captured by microphone 136. In some embodiments the microphone 136 is local to the headphones 138 or other head-worn component of the user. In some embodiments the microphone 136 is interfaced to the computing device 104 by a Bluetooth® link. In some embodiments the microphone 136 comprises a plurality of microphone elements. This can allow users to talk to each other, while engaging in a collaborative experience, making it more fun and social. Allowing users to talk to each other could also be distracting and could be not allowed.

The audio subsystem 134 generally also includes headphones 138 (or other similar personalized audio presentation units that display audio content to the ears of a user). The headphones 138 may be connected by wired or wireless connections. In some embodiments the headphones 138 are interfaced to the computing device 104 by the Bluetooth® communication link.

The computing device 104 includes an operating system, the necessary hardware and software drivers necessary to fully utilize the devices coupled to the communications infrastructure 132, media playback and recording applications and at least one Collaborative Intent Application 144 operatively loaded into main memory 604, which is designed to display information to a user, collect input from that user, and communicate in real-time with the Central Collaboration Server 142. Optionally, the computing device 104 is envisioned to include at least one remote authentication application, one or more cryptography applications capable of performing symmetric and asymmetric cryptographic functions, and secure messaging software. Optionally, the computing device 104 may be disposed in a portable form factor to be carried by a user.

Adaptive Confidence Calibration Weighting Factor

As described in related U.S. patent application Ser. No. 14/708,038 by the current inventor, which is hereby incorporated by reference, additional systems and methods were disclosed that encourage groups of real-time users who are collaboratively answering questions by controlling a pointer, to produce coherent responses while discouraging incoherent responses. A number of methods were disclosed therein, including (a) Coherence Scoring, (b) Coherence Feedback, and (c) Tiered Processing. These and other techniques greatly enhance the effectiveness of the resulting intelligence.

As described in related U.S. patent application Ser. No. 14/738,768 by the current inventor, which is hereby incorporated by reference, systems and additional novel methods were disclosed for making the process of working as a group-wise collaborative intelligence more intuitive for the participating users. More specifically, novel systems and methods were disclosed that enable individual users to intuitively impart their own personal intent upon a graphical pointer that's being collaboratively controlled through real-time synchronous input collected from a plurality of users. Some disclosed embodiments support users interfacing with a mouse, touchpad, trackball, or touchscreen. Other embodiments support users interfacing by tilting a mobile computing device such as a phone or tablet. Some preferred methods employ a manipulatable GRAPHICAL MAGNET such that each user positions the magnet so as to impart a simulated pull on the group-wise pointer. The sum (or average) of a plurality of user's individual pulls are then used to influence the group-wise motion of the pointer, thus providing a physically intuitive control paradigm. This and other novel solutions disclosed therein, solved the unique problems posed by enabling real-time synchronous collaborative control of a group-wise pointer, thus enabling more effective Artificial Swarm Intelligence systems.

As described in related U.S. patent application Ser. No. 14/859,035 by the present inventor, and hereby incorporated by reference, a system and methods have been developed for enabling artificial swarms of users to modify its configuration dynamically over time, optimizing the performance of the emergent intelligence by altering its population and/or the connection strength of members of that population. In some such embodiments the members of a swarm can selectively eject one or more low performing member of that swarm (from the swarm), using the group-wise collaborative decision-making techniques herein. As also disclosed, swarms can be configured to dynamically adjust its own configuration, not by ejecting members of the swarm but by adjusting the relative weighting of the input received from members of the swarm. More specifically, in some embodiments, algorithms are used to increase the impact (weighting) that some users have upon the collective pull of the puck, while decreasing the impact (weighting that other users have upon the collective pull of the puck. In this way, the swarm intelligence is adapted over time by the underlying algorithms disclosed herein, strengthening the connections (i.e. input) with respect to the more collaborative users, and weakening the connections with respect to the less collaborative users. In this way, the collaborative swarm in controlled in a manner innovatively reminiscent of an adaptable neural network that optimizes its intelligence over time.

While the prior systems described above, enable human groups to amplify their collective intelligence and produce optimized predictions, forecasts, and decisions, what is needed is are inventive methods that further optimize the intelligence of an Artificial Swarm Intelligence system so that it generates predictions, forecasts, and decisions of even greater accuracy. Currently, Artificial Swarm Intelligence systems use methods that enable users to express not just their opinion, but their level of conviction in an opinion by varying the user interface in unique ways, for example by moving a graphical magnet closer or further from a collaboratively controlled object. Enhanced methods have also been developed that predict levels of conviction based on tracking unique behaviors of participants (for example, choice—switching) as disclosed by the present inventor in related patent application Ser. No. 15/640,145, filed Jul. 3, 2016 which is hereby incorporated by reference. These prior methods are effective, but do not address the fact that human participants are not consistent (from person to person) in how they express their own personal conviction based on their actual levels of knowledge and insight. For example, some individuals have high degrees of knowledge or insight, but lack self-confidence and therefore express lower conviction levels than they should when participating with others within an artificial swarm intelligence. Other individuals have low degrees of knowledge or insight, but are over-confident, and therefore express higher degrees of conviction within an artificial swarm intelligence. And other individuals, fall between these extremes, resulting in a spectrum of complex relations between actual knowledge (or insight) and expressed personal conviction in opinions which distorts the dynamics of the artificial swarm intelligence system, preventing accuracy from being as optimized as it could. To address this shortcoming, inventive methods have been developed by the present inventor, as disclosed below herein, which aim to calibrate the expressed real-time input provided by individual participants in an artificial swarm intelligence based on a predictive relationship between their actual knowledge levels and their unique personal tendency to convey confidence (or conviction) levels. This process is referred to herein generally as "Adaptive Confidence Calibration" and has been implemented in a number of unique and inventive manners, as disclosed herein.

Figure 7:
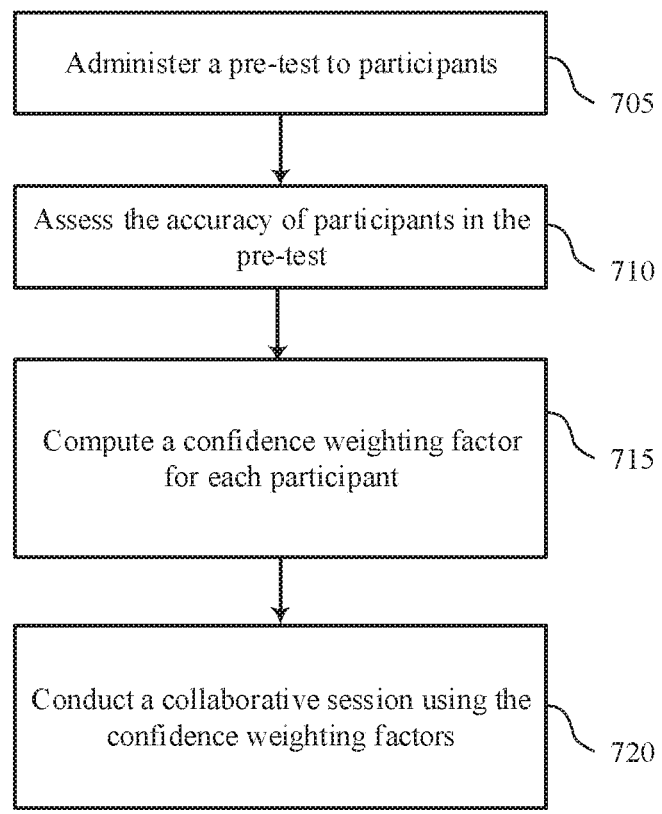
FIG. 7 is a flowchart of a process performed by the closed-loop collaboration system for facilitating collaboration using closed-loop, dynamic group feedback in accordance with aspects of the present disclosure.

FIG. 7 illustrates an example of a process performed by the closed-loop collaboration system 100 for facilitating collaboration using closed-loop, dynamic group feedback in accordance with aspects of the present disclosure. In some examples, a computing device may execute a set of codes to control functional elements of the computing device to perform the described functions. Additionally or alternatively, a computing device may use special-purpose hardware. These operations may be performed according to the methods and processes described in accordance with aspects of the present disclosure. For example, the operations may be composed of various substeps, or may be performed in conjunction with other operations described herein.

It will be understood that while some steps are disclosed herein as being carried out by the CCS 102, and others by the computing devices 104, that in other exemplary collaboration systems the steps may be carried out by other devices in the system 100. For example, in the system where one computing device 104 is running the CMA 110, that computing device 104 would perform the steps of the CCS 102. In another example, in lieu of the computing device 104 sending information to the CCS 102, which then performs the calculations, the CCS 102 may send some data (such as group performance) to each computing device 104, which would then perform calculations for the individual user.

In the administer pre-test step 705, a pre-test is administered to all participants (i.e. users) in the group. The pre-test requires each participant to (a) answer a set of subject-matter questions by engaging a survey or other user interface on a local computing device, (b) generate a personal accuracy prediction about the answers they gave to the set of subject-matter questions, for example estimating the number or percentage of subject-matter questions they got correct by engaging a survey or other user interface of a local computing device, and (c) generate a group accuracy prediction for the full set of participants when answering the set of subject-matter questions by engaging a survey or other user interface of a local computing device.

In the next assess accuracy step 710, the system 100 assesses the answers provided by each participant to the pre-test questions to, (a) determine the accuracy of the responses given by each individual participant, thereby generating a personal accuracy score for that participant, (b) determine the average accuracy across the set of participants, thereby generating a group accuracy score for the participants.

In the next compute weighting factor step 715, the system 100 computes the confidence weighting factor for each participant using (a) the personal accuracy score of that participant, (b) the accuracy of the personal accuracy prediction made by that participant (i.e. how close the personal accuracy prediction was to the actual personal accuracy score for that participant), and (c) the accuracy of the group accuracy prediction made by that participant (i.e. how close the group accuracy prediction made by that individual was to the actual group accuracy score for the full set of participants).

In the final conduct session step 720, the group of participants, via the system 100, collaboratively answer one or more questions by jointly controlling the pointer 210 to select an answer option from a set of answer options (as previously described herein and in related applications), wherein the Confidence Weighting Factors generated for at least one participant are used to scale the relative impact of at least one participant with respect to a plurality of other participants in the collaborative control process.

Figure 8:
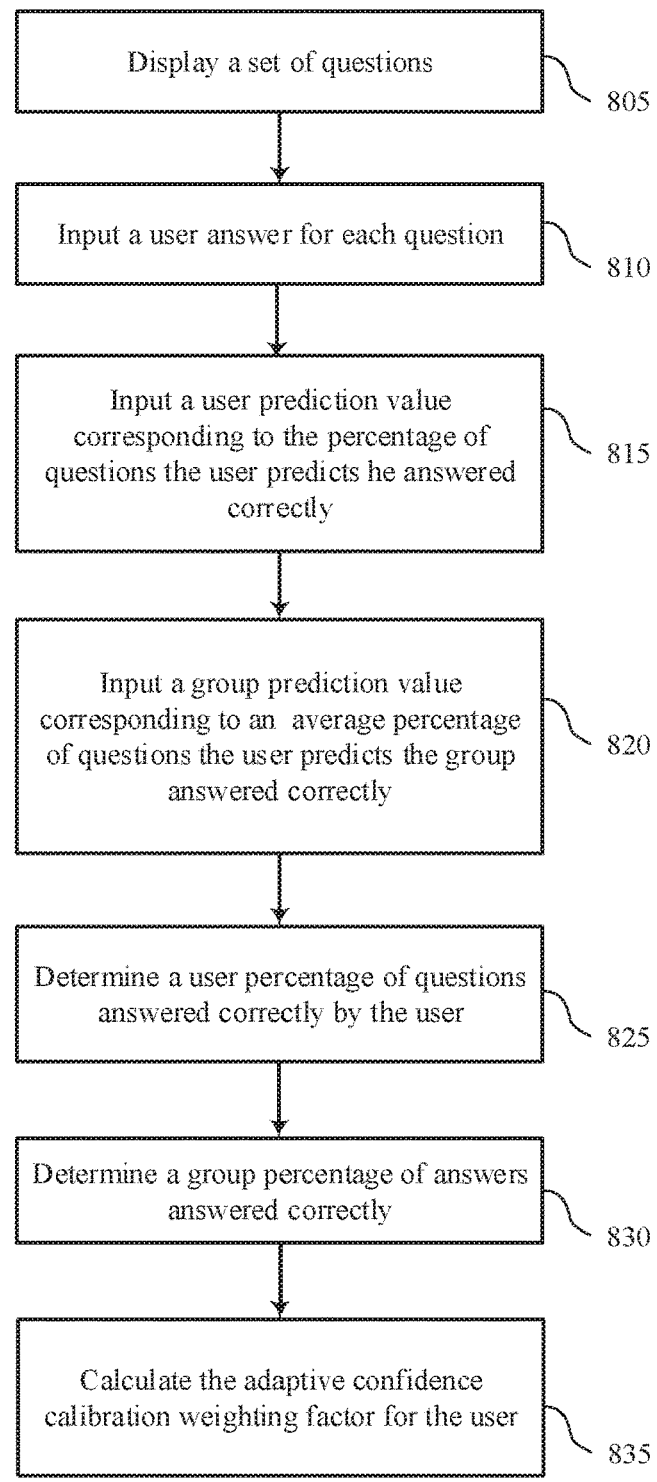
FIG. 8 is a flowchart of a process for determining a weighting factor performed by the closed-loop collaboration system for facilitating collaboration using closed-loop, dynamic group feedback in accordance with aspects of the present disclosure.

FIG. 8 illustrates another example of a process for determining a weighting factor performed by the closed-loop collaboration system 100 for facilitating collaboration using closed-loop, dynamic group feedback in accordance with aspects of the present disclosure. In some examples, a computing device may execute a set of codes to control functional elements of the computing device to perform the described functions. Additionally or alternatively, a computing device may use special-purpose hardware. These operations may be performed according to the methods and processes described in accordance with aspects of the present disclosure. For example, the operations may be composed of various substeps, or may be performed in conjunction with other operations described herein.

It will be understood that while some steps are disclosed herein as being carried out by the CCS 102, and others by the computing devices 104, that in other exemplary collaboration systems the steps may be carried out by other devices in the system 100. For example, in the system where one computing device 104 is running the CMA 110, that computing device 104 would perform the steps of the CCS 102. In another example, in lieu of the computing device 104 sending information to the CCS 102, which then performs the calculations, the CCS 102 may send some data (such as group performance) to each computing device 104, which would then perform calculations for the individual user.

At block 805 the computing device 104 may The questions include, for example, the pre-test subject-matter questions described with respect to FIG. 7.

At block 810 the computing device 104 may receive input, from the user, a user answer for each question. The computing device 104 then sends the input to the CCS 102.

At block 815 the computing device 104 may receive input, from the user, of a user prediction value corresponding to the percentage of questions the user predicts he answered correctly. The computing device 102 then send the input to the CCS 104.

At block 820 the computing device 104 may receive input, from the user, of a group prediction value corresponding to an average percentage of questions the user predicts the group answered correctly.

At block 825 the CCS 102 may, using the user answers determined in step 1410, determine a user percentage of questions answered correctly by the user. This may be represented as a user prediction score.

At block 830 the CCS 102 may receive, from user responses input via other computing devices 104 in the system 100, answers to the questions as input by each of the other users in the group, and determine an overall group percentage of answers answered correctly by the group. This may be represented as a group percentage score. It may be computed as the average percent correct across the full set of participants.

At block 835 the CCS 102 may calculate of the adaptive confidence calibration weighting factor for the user based on at least one of comparing the user prediction value to the user percentage score and comparing the group prediction value to the group percentage score.

Referring again to FIGS. 7 and 8, to reach optimized solutions, the human participants in an Artificial Swarm Intelligence system are often not treated as equal contributors when working together to converge on an optimal solution. In many current methods, participants who express higher confidence (or higher 'conviction') are assigned greater contributions to system dynamics than participants who express lower confidence (or lower conviction). The prior methods and algorithms that enable this are responsive to the real-time user behaviors while swarming, indicative of varying confidence levels (or 'conviction' levels). For example, users can manually express confidence levels through the user interface. In some such prior disclosed embodiments, users do this by moving a graphical magnet closer or further form a collaboratively controlled pointer. In other prior disclosed embodiments, algorithms track when users switch their opinions during the swarming process and assign reduced confidence for a period of time following the switched opinion. This is a secondary method of modulating confidence, based on directly expressed reduced confidence, but based on a behavior that suggests reduced confidence. These current methods works well, especially when the participants are self-aware, knowing not just what they can accurately convey but also knowing the limits of their personal insights.

That said, when participants are unaware of the limits of their own personal insights or are poorly aware (i.e. they overestimate the scope of what they actually know, or if they underestimate the value of what they do really know) they may express confidence levels that are unjustified. For example, an unjustly overconfident user might express full input magnitude in a flawed or misguided input, and might not switch to an alternative input due to overconfidence. Similarly, an unjustly under-confident user might express weak confidence in a valid input, or might be easily swayed by the behaviors of others, and switch from an accurate input to a less accurate input due to his or unjustified personal under-confidence. In such cases, user contributions to the dynamic system of the swarm are not optimal, for they don't reflect their level of knowledge and insight accurately. This limits the potential accuracy of an artificial swarm intelligence system. To address this shortcoming, unique methods and systems have been developed as disclosed herein which aim to account for variations in expressed confidence, compensating for users who tend to be unjustly overconfident or unjustly under confident as compared to other participants in the system. This process is referred to herein generally as "Adaptive Confidence Calibration" and has been implemented in a number of unique and inventive manners, as disclosed herein, which calibrates for personal biases in judgment due to confidence.

This is an important improvement because in general, people are poor judges of their own personal knowledge, often overestimating the accuracy of their decision-making abilities, and in some cases underestimating the scope of their knowledge as compared to others. Many research studies have shown that people tend to overestimate their understanding of material they have just reviewed, while other studies have shown that people overestimate the accuracy of their general knowledge about common subjects such as geography, history, literature, science, and sports.

The correspondence between a person's subjective confidence and their objective knowledge level is referred to herein as "confidence calibration". A person who is deemed well-calibrated if their confidence matches their actual level of knowledge or insight compared to other participants. Persons deemed to be poorly-calibrated if they are significantly over-confident or under-confident compared to their actual level of knowledge or insight compared to other participants. Poorly calibrated participants in an Artificial Swarm Intelligence system have the potential to distort results and prevent the system from converging on the most optimal solutions.

To address the potential mismatch between expressed confidence and insight levels in subjective knowledge-based judgment tasks, the method of FIGS. 7 and 8, called Adaptive Confidence Calibration (ACC), has been developed to improve the overall accuracy of Artificial Swarm Intelligence systems. The objective is to derive the ACC Weighting Factor, for use in the Artificial Swarm Intelligence algorithms, that reduces the impact of participants who demonstrate over-confidence bias and increases the impact of participants who demonstrate under-confidence bias. It's important to note, these methods are not aimed at weighting the impact of participants based on their actual prior accuracy levels (a technique that disclosed in prior applications from the present inventor), but instead aims to weight the input of participants based by their introspective ability to be self-aware of how their knowledge level and/or insight level compares to others and express appropriate confidence (or 'conviction') in the swarm (i.e., in the full population of real-time collaborative participants).

As previously described, to compute ACC weighting factors for the participants in an Artificial Swarm Intelligence the pre-test is administered to participants, asking them to (a) answer a set of questions, (b) predict their personal accuracy in those answers, and (c) predict the average accuracy of the other participants in the swarm when answering the set of questions. The set of questions may or may not be directly related to the questions the Artificial Swarm Intelligence will answer together as a system. The set of questions are responded to individually by the participants, through a private interface such that they are unaware of the responses provided by other users to other similar questions. In some embodiments, the questions may be administered using standard polling software tools. In other embodiments, the questions are administered using custom software. The answers may be multiple choice, or may involve numerical answers entered as text or with graphical controls such as dials, sliders, or scroll bars.

The methods for assigning ACC weighting factors include one or both of the following heuristics:

A) Participants who more accurately predict their own personal rate of correct answers in the given pre-test questions, are assigned a higher ACC weighting factor than participants who less accurately predict their own rate of correct answers in the pre-test questions.

B) Participants who more accurately predict the average rate of correct answers across the population of participants in the given pre-test questions, are assigned a higher ACC weighting factor than participants who less accurately predict the average rate of correct answers across the population of participants in the pre-test questions.

In this way, the inventive methods disclosed herein use either or both methods in assigning ACC weighting factors—using (a) a person's ability to predicting their own accuracy in the pre-test questions, using (b) a person's ability to predict the group's average accuracy in the pre-test questions, or (c) using both a person's ability to predict their own accuracy and the group's average accuracy in the pre-test questions. Note—the reason for these two different methods, as well as the combined method, is that they reveal different aspects of a person's self-awareness as to their own personal level of knowledge and/or insights as compared to the group they are participating with in the collective swarm.

In one embodiment of the present invention, each participant in an Artificial Swarm Intelligence is asked to individually answer 5 test questions, each of said test questions having a known correct or incorrect answer. These test questions, are ideally subject specific to the task the Artificial Swarm Intelligence will be performing as a unified intelligence. In one example embodiment, the swarm will be predicting the outcome of baseball games to be played within the next 24 hours. As the topic is baseball, the five test questions may include baseball related questions with known outcomes. For example, a set of team matchups, the question asking which team won the most times over the last five times they played each other. Five such questions would be asked of the individual participants as follows:

1. Which team won the most times, the Cubs or the Cardinals, over the last 5 times they played each other in a regular season matchup? Answer: [ ] CUBS or [ ] CARDINALS 2. Which team won the most times, the Braves or the Mets, over the last 5 times they played each other in a regular season matchup? Answer: [ ] BRAVES or [ ] METS 3. Which team won the most times, the Nationals or the Marlins, over the last 5 times they played each other in a regular season matchup? Answer: [ ] NATIONALS or [ ] MARLINS 4. Which team won the most times, the Pirates or the Red Sox, over the last 5 times they played each other in a regular season matchup? Answer: [ ] PIRATES or [ ] RED SOX 5. Which team won the most times, the Royals or the Twins, over the last 5 times they played each other in a regular season matchup? Answer: [ ] ROYALS or [ ] TWINS 6. What Percentage of the prior five questions do you think you answered correctly? ANSWER: 0% to 100%

7. What Percentage of the prior five questions do you think the group, on average got correct? ANSWER: 0% to 100%

A user's answer to question 6 above is a numerical value, referred to herein as Self-Predicted-Accuracy and is a number between 0% and 100%. The user's actual accuracy in the test questions can be computed as the percentage of the test questions the user actually got correct. This is a value referred to herein as the Actual-User-Accuracy and is a number between 0% and 100%. These two numbers can then be used to compute how well the user predicted his or her own accuracy. In one embodiment, this is referred to the Self-Assessment Accuracy and is computed as follows:

$$\text{'Self-Assessment Accuracy'}=(100-\text{Abs}(\text{'Self-Predicted Accuracy'}-\text{'Actual User Accuracy'}))/(100)$$

The Self-Assessment Accuracy is a number between 0 and 1, where 1 is perfect self-assessment accuracy, and 0 is maximally wrong.

A user's answer to question 7 above is referred to herein as their Group-Predicted Accuracy and is also a number between 0% and 100%. The group's actual average accuracy in the test questions can be computed as the average percentage of the test questions the group actually got correct. This is a value referred to herein as the Actual Group Accuracy and is a number between 0% and 100%. These two numbers can then be used to compute how well the user predicted the Group's accuracy. In one embodiment, this is referred to the Group-Assessment Accuracy and is computed as follows:

$$\text{'Group-Assessment Accuracy'}=(100-\text{Abs}(\text{'Group-Predicted Accuracy'}-\text{'Actual Group Accuracy'}))/(100)$$

The Group-Assessment Accuracy is a number between 0 and 1, where 1 is perfect group-assessment accuracy, and 0 is maximally wrong.

The final step is to use one or both of the values above (Self-Assessment Accuracy and Group-Assessment Accuracy) to compute the Adaptive Confidence Calibration Weighting Factor. In one embodiment that uses both values, the ACC weighting factor is computed as follows:

$$\text{'ACC Weighting Factor'}=((\text{'Self-Assessment Accuracy'})+(\text{'Group-Assessment Accuracy'}))/2$$

The ACC Weighting Factor is a number between 0 and 1, where 1 is perfect awareness of accuracy, and 0 is no awareness.

Testing has shown this may overweight the importance of the Group-Assessment and underweight the importance of the Self-Assessment in computing an accurate weighting factor. So, an alternative model counts the self-assessment more, as follows:

$$\text{'ACC Weighting Factor'}=(2\times(\text{'Self-Assessment Accuracy'})+(\text{'Group-Assessment Accuracy'}))/3$$

The ACC Weighting Factor is again a number between 0 and 1, where 1 is perfect awareness of accuracy, and 0 is no awareness.

The ACC Weighting Factor is then an indicator not of how accurate the user is in answering the set of test questions, nor is it a measure of how accurate the group is in answering the test questions, but instead it's a measure of how self-aware the user is in predicting his or her own accuracy as well as in predicting how hard or difficult the set of test questions will be for others in the group.

The ACC Weighting Factor for a given user can then be used within the swarming algorithms to adjust the relative impact of that user's input (as compared to other users) in the swarm dynamics. More specifically, a user's input, which is generally modeled as a force vector applied upon a collaboratively controlled graphical object, can be modulated based upon the ACC Weighting Factor. In one such embodiment, the force applied in response to input from a given user is scaled based on the ACC Weighting Factor for that user. In this way a user's force level can be modeled as:

'User Input Magnitude'='User Input Vector'*'ACC Weighting Factor'

Testing has shown that this level of scaling is sometimes too severe. In another embodiment, the weighting factor is tempered, such that the scaling has a smaller impact as follows:

'User Input Magnitude'='User Input Vector'*(2+ 'ACC Weighting Factor')/3

Note, the term User Input Vector is described in the related applications that were previously incorporated by reference. In some instances the words User Input Force is also used. Also as described above User Input Magnitude is intended to refer to a scaled magnitude of the User Input Vector, while the directional orientation remains unchanged.

In some embodiments, one or more questions is added to the pre-test questions listed above, asking the user to assess the difficulty level of one or more of the pre-test questions. For example, a question #8 could be added to the list above in some embodiments as follows:

8. Rate the difficulty of question #3 on a scale of 1 to 10? ANSWER: 1 to 10

Additional questions can be added, asking the user to assess the difficulty of other questions in the set. These difficulty ratings are useful because a person's perception of difficulty of questions gives additional insight into their self-expression of confidence, over-confidence, or under-confidence. That's because some users express over-confidence in questions they perceive as easy, and express under-confidence in questions they perceive as hard. In some such embodiments, the ACC weighting factor is modulated based on an assigned difficulty level of the question posed to an Artificial Swarm Intelligence.

Figure 9:
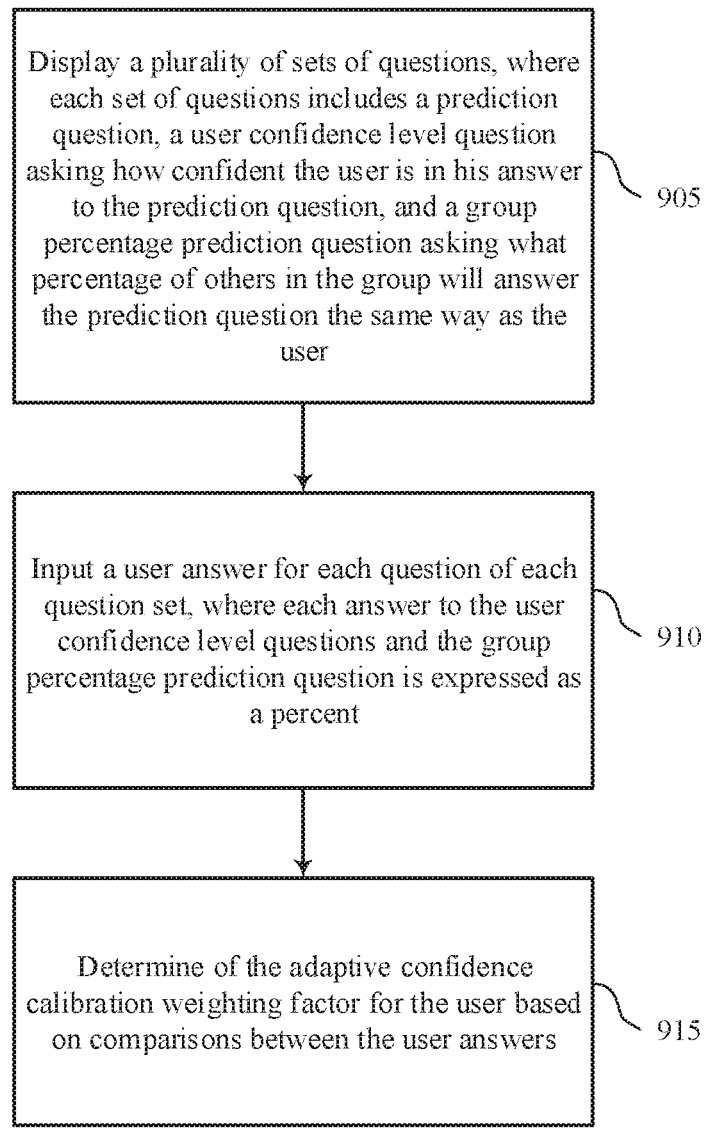
FIG. 9 is a flowchart of a process performed by a computing device for facilitating collaboration with closed-loop, dynamic group feedback in accordance with aspects of the present disclosure.

FIG. 9 illustrates an example of a process performed by a computing device for facilitating collaboration with closed-loop, dynamic group feedback in accordance with aspects of the present disclosure. In some examples, a computing device may execute a set of codes to control functional elements of the computing device to perform the described functions. Additionally or alternatively, a computing device may use special-purpose hardware. These operations may be performed according to the methods and processes described in accordance with aspects of the present disclosure. For example, the operations may be composed of various substeps, or may be performed in conjunction with other operations described herein.

At block 905 the computing device may display, to the user, a plurality of sets of questions, wherein each question set includes a prediction question, a user confidence level question asking how confident the user is in his answer to the prediction question, and a group percentage prediction question asking what percentage of others in the group will answer the prediction question the same way as the user.

At block 910 the computing device may receive input, from the user, a user answer for each question of each question set, wherein each answer to the user confidence level questions and the group percentage prediction question is expressed as percent.

At block 915 the CCS 102 may, upon receiving the user answers provided in step 810, determine of the adaptive confidence calibration weighting factor for the user based on comparisons between the user answers.

Referring again to FIG. 9, the above methods described in FIGS. 7 and 8 allow us to derive and refine ACC weighting factors based on the accuracy of answers to sample questions of known outcome. But what about situations where we don't have sample questions that are equivalent to the required task at hand. It's desired to be able to compute ACC weighting factors without the need of test questions of a known outcome, as it simplifies the requirements of the process. To achieve this, an inventive method has been developed that uses a behavioral economics concept that is sometimes referred to as "meta-knowledge" to adjust the weighting factors used in an Artificial Swarm Intelligence. The method asks each participant to individually predict how the other participants will respond to a question, forecasting for example the percentage of peers who will respond affirmatively vs negatively. Behavior economics research shows that individuals who are most accurate at predicting how others will respond to a question, are also most likely to be accurate in answering the given question itself (or related questions). This is especially true if the given participant responds with one answer, but correctly predicts the majority of peers will provide an alternate answer. If such a circumstance arises, it demonstrates the individual possess what is sometimes called "meta-knowledge", for he or she demonstrates insight into how people will react to the given question, even if those reactions are different than their own. And because this method does not look at accuracy of predictions, just the distribution of predictions, it can be applied to questions in process for which that actual outcome is not known.

As applied to the predictive systems disclosed herein, a pre-test question can be asked to the participants in an Artificial Swarm Intelligence which are exactly the same as the questions that will be asked to the full swarm as a unified system. In one example, the questions could be as follows:

1. Which team will win tonight, Cubs or Cardinals? Answer: [ ] CUBS or [ ] CARDINALS 2. What is your confidence level? ANSWER: 0 to 100%

3. What percentage of other participants answered the same as you? ANSWER: 0 to 100%

4. Which team will win tonight, Braves or Mets? Answer: [ ] BRAVES or [ ] METS

5. What is your confidence level? ANSWER: 0 to 100%

6. What percentage of other participants answered the same as you? ANSWER: 0 to 100%

7. Which team will win tonight, Nationals or Marlins? Answer: [ ] NATIONALS or [ ] MARLINS 8. What is your confidence level? ANSWER: 0 to 100%

9. What percentage of other participants answered the same as you? ANSWER: 0 to 100%

10. Which team will win tonight, Pirates or Red Sox? Answer: [ ] PIRATES or [ ] RED SOX 11. What is your confidence level? ANSWER: 0 to 100%

12. What percentage of other participants answered the same as you? ANSWER: 0 to 100%

13. Which team will win tonight, Royals or Twins? Answer: [ ] ROYALS or [ ] TWINS 14. What is your confidence level? ANSWER: 0 to 100%

15. What percentage of other participants answered the same as you? ANSWER: 0 to 100%

16. What Percentage of the prior five questions do you think you answered correctly? ANSWER: 0% to 100%

17. What Percentage of the prior five questions do you think the group, on average got correct? ANSWER: 0% to 100%

In this instance, we have the added complexity of asking two follow up questions, after each substantive prediction.

But we have the benefit of not needing to know the actual answer to the substantive question posed. In fact, we can ignore that answer altogether—it's a prompt for the user, but not for our analysis. Instead, we only care about the two subjective assessment questions that follows each substantive question. In other words, we care most about the pairs of questions 2,3 and 5,6 and 8,9 and 11,12 and 14,15 because these reveal something very important about the user who answered them.

More specifically, these questions reveal a relationship between that person's self-assessment of confidence and their prediction as to how well other people would have done answering the same question. There are a number of interesting conditions to evaluate with inventive algorithms.

CONDITION #1: if a user reports high confidence in their own prediction (for example 70% or greater) in the first question in each subjective assessment pair (for example question #2 above), they believe strongly they made the correct forecast for the game in question. If they also believe that most people answered the same as them (for example, 70% or greater) in the second subjective question in each subjective assessment pair (for example question #3 above), they believe most people are likely to have got the question right, just like themselves—so it was an easy forecast. Such a situation does not indicate if this person has a strong self-awareness (i.e. are well calibrated on confidence, or not). They might be self-aware, but this situation gives no insight because we don't know if this person was correct that the question was easy, and thus most people would get it right, or if the user has misjudged the question as being easy, and thus applied their same misjudgment to others as well as to themselves.

Thus, our algorithms in this condition uses a neutral middle value for the ACC weighting factor of 0.5.

CONDITION #2: if a user reports high confidence in their own prediction (for example 75% or greater) in the first question in each subjective assessment pair (for example question #2 above), they believe strongly they made the correct forecast for the game in question. If they also believe that most people answered differently than them (for example, 25% or less) in the second subjective question in each subjective assessment pair (for example question #3 above), they believe most people are likely to have got the question wrong, even though they themselves got it right. In other words, they believe this was a difficult question and yet they believe they got it correct. This suggests they may have self-awareness as to the difficulty of the question, but believe they possess unique insights that allowed them to do better at answering than most people. Such a situation suggests this person has deeper self-awareness than the average participant. Thus, our algorithms in this condition uses a value for the ACC weighting factor between 0.5 and 1.0, based on the amount their own confidence was greater than 50% and the amount they believe others will answer the way they did was below 50%. One way to compute this is:

'ACC Weighting Factor'=('User Confidence'−50%)/100+(50%−'Percent that Answered the same')/100

As this only applies for certain situations, for example when User Confidence is 75% or more, and the predicted percent that answered the same is 25% or less, the range of the ACC weighting factor will be between 0.5 and 1.

In other embodiments, the function can be scaled differently, but the principle is the same—to derive the ACC weighting factor value to be higher than nominal based on (a) high user confidence combined with (b) a user prediction that most people did not answer the same way the user did.

CONDITION #3: if a user reports low confidence in their own prediction (for example 25% or less) in the first question in each subjective assessment pair (for example question #2 above), they clearly believe they don't have sufficient knowledge or insight to answer. If they also believe that most people answered differently than them (for example, 25% or less were the same) in the second subjective question in each subjective assessment pair (for example question #3 above), they believe that although they lack the knowledge and insight, other people most likely have that knowledge. Thus their reason for having low confidence in their prediction is not because the question was hard, but because they lack the insight to give a good answer although most people possess that insight. This suggests strong self-awareness, as the person knows what they don't know, as compared to other people. Thus, our algorithms in this condition uses a value for the ACC weighting factor between 0.5 and 1.0, based on the amount their own confidence was greater than 50% and the amount they believe others will answer the way they did was below 50%. One way to compute this is:

'ACC weighting factor'=(50%−'User Confidence')/100+('Percent that Answered the same'−50%)/100

As this only applies for certain situations, for example when User Confidence is 25% or less, and the predicted percent that answered the same is 25% or less, the range of the ACC weighting Factor will be between 0.5 and 1.

In other embodiments, the function can be scaled differently, but the principle is the same—to derive the ACC weighting factor value to be higher than nominal based on (a) high user confidence combined with (b) a user prediction that most people did not answer the same way the user did.

An alternative inventive algorithm, as disclosed herein, computes a low ACC weighting factor value for Condition #3 if across a full set of test questions (for example questions 1 to 15 on page 8) they reveal low confidence in their own responses via the first question of each subjective pair (ie. questions 2, 5, 8, 11, 14) and low belief that others will answer the way they did on the second question of each subjective pair (i.e. questions 3, 6, 9, 12, 15). That's because if the user answers this way across all the test questions, it's clear they believe they lack the knowledge and insight to answer any of the test questions, but that the majority of other people possess that knowledge and insight. Thus we have a situation where the person is both-self-aware and believes they lack sufficient knowledge to be a strong contributor in this general subject area. If that's the case, the person will not be a strong contributor to the swarm. So even though the person is self-aware and likely to modulate their confidence at appropriate levels, it does make algorithmic sense to reduce that person's ACC weighting factor value and thus reduce their contribution to the dynamics of the swarm as compared to the average contributor.

Figure 10:
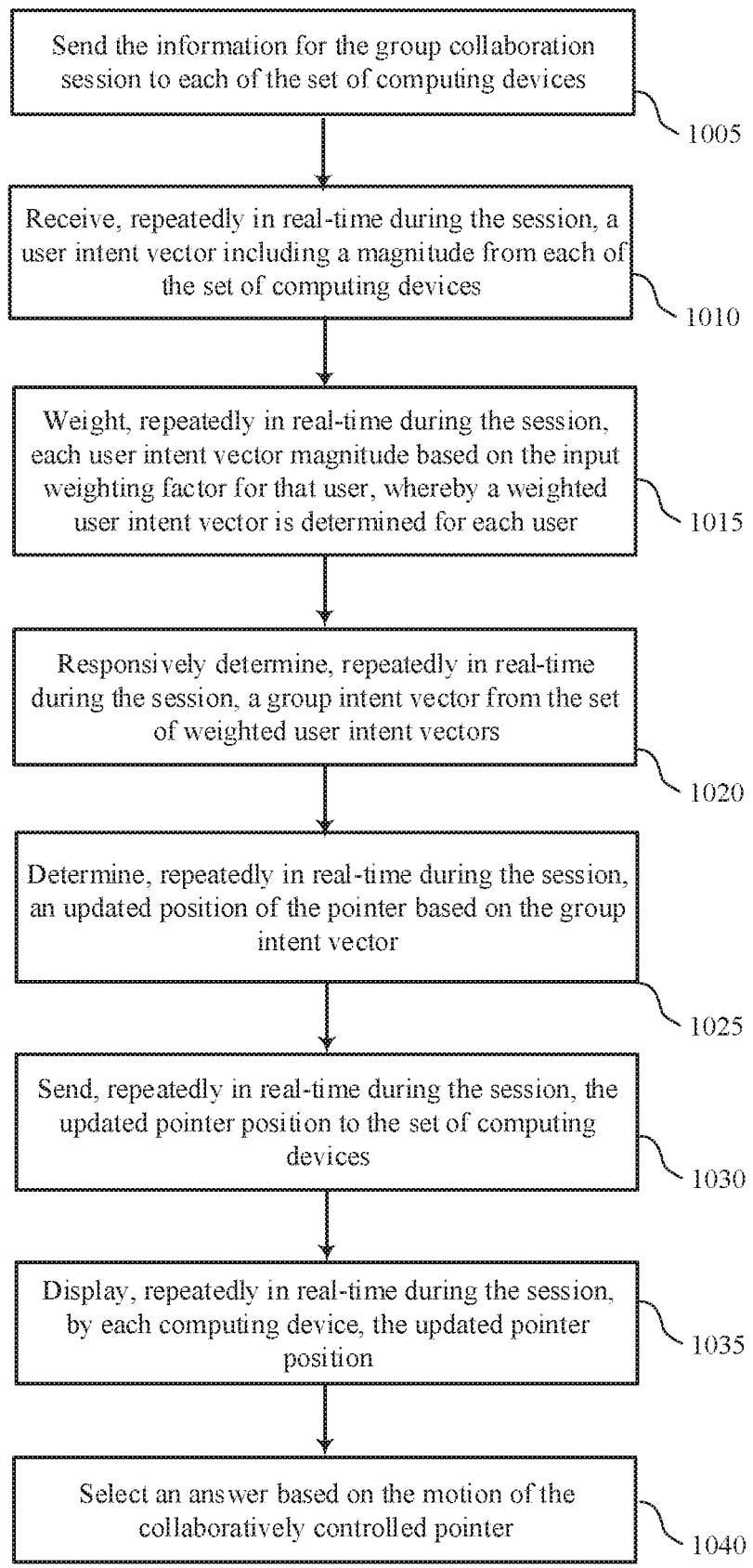
FIG. 10 is a flowchart of a process performed by the group collaboration system for facilitating collaboration with closed-loop, dynamic group feedback in accordance with aspects of the present disclosure.

FIG. 10 illustrates an example of a process performed by the group collaboration system 100 for facilitating collaboration with closed-loop, dynamic group feedback in accordance with aspects of the present disclosure. In some examples, a computing device may execute a set of codes to control functional elements of the computing device to perform the described functions. Additionally or alternatively, a computing device may use special-purpose hardware. These operations may be performed according to the methods and processes described in accordance with aspects of the present disclosure. For example, the operations may be composed of various substeps, or may be performed in conjunction with other operations described herein.

At block 1005 the CCS 102 may send the information for the group collaboration session to each of the plurality of computing devices 104, including a question and a set of answer options. In one embodiment each of the answer options are associated with a location on a target board displayed on each computing device 104, such as the displays 200, 300 and 400 of FIGS. 2-4. In some embodiments the question is constructed to elicit a prediction, a forecast or a decision.

At block 1010 the CCS 102 may receive, repeatedly in real-time from each computing device 104 in the group during the session, the user intent vectors including the magnitude.

At block 1015 the CCS 102 may weight, repeatedly in real-time during the session, each user intent vector magnitude based on the current weighting factor for that user, whereby a weighted user intent vector is determined for each user.

At block 1020 the CCS 102 may responsively determine, repeatedly in real-time during the session, a group intent vector from the plurality of weighted user intent vectors.

At block 1025 the CCS 102 may determine, repeatedly in real-time during the collaboration session, an updated coordinate position of the collaboratively controlled pointer 210 with respect to the set of answer options arranged on the target board, based at least in part upon the group intent vector.

At block 1030 the group collaboration system may send, repeatedly in real-time during the session, the updated coordinate position to the plurality of computing devices.

At block 1035 the group collaboration system may display, repeatedly in real-time during the session, by each computing device, the updated coordinate position.

At block 1040 the group collaboration system may select an answer based on the motion of the collaboratively controlled pointer.

Referring again to FIG. 10, as described previously, the ACC Weighting factor for a given user is used within the real-time swarming algorithms to adjust the relative impact of that user's input (as compared to other users) in the swarm dynamics. For details about swarm dynamics and user input vectors, see the prior applications that were previously incorporated by reference.

In this inventive embodiment, a user's input, which is generally modeled as a force vector applied upon a collaboratively controlled graphical object, is modulated based upon the ACC Weighting Factor. In one such embodiment, the force applied in response to input from a given user is scaled based on the ACC-Weighting-Factor for that user. In this way a user's force level can be modeled as:

'User Input Magnitude'='User Input Vector'*'ACC Weighting Factor'

Testing has shown that this level of scaling is sometimes too severe. In another embodiment, the weighting factor is tempered, such that the scaling has a smaller impact as follows:

'User Input Magnitude'='User Input Vector'*(2+ 'ACC Weighting Factor')/3

Note, the term User Input Vector is described in the related applications that were previously incorporated by reference. In some instances the words User Input Force is also used. Also as described above User Input Magnitude is intended to refer to a scaled magnitude of the User Input Vector, while the directional orientation remains unchanged.

Figure 11:
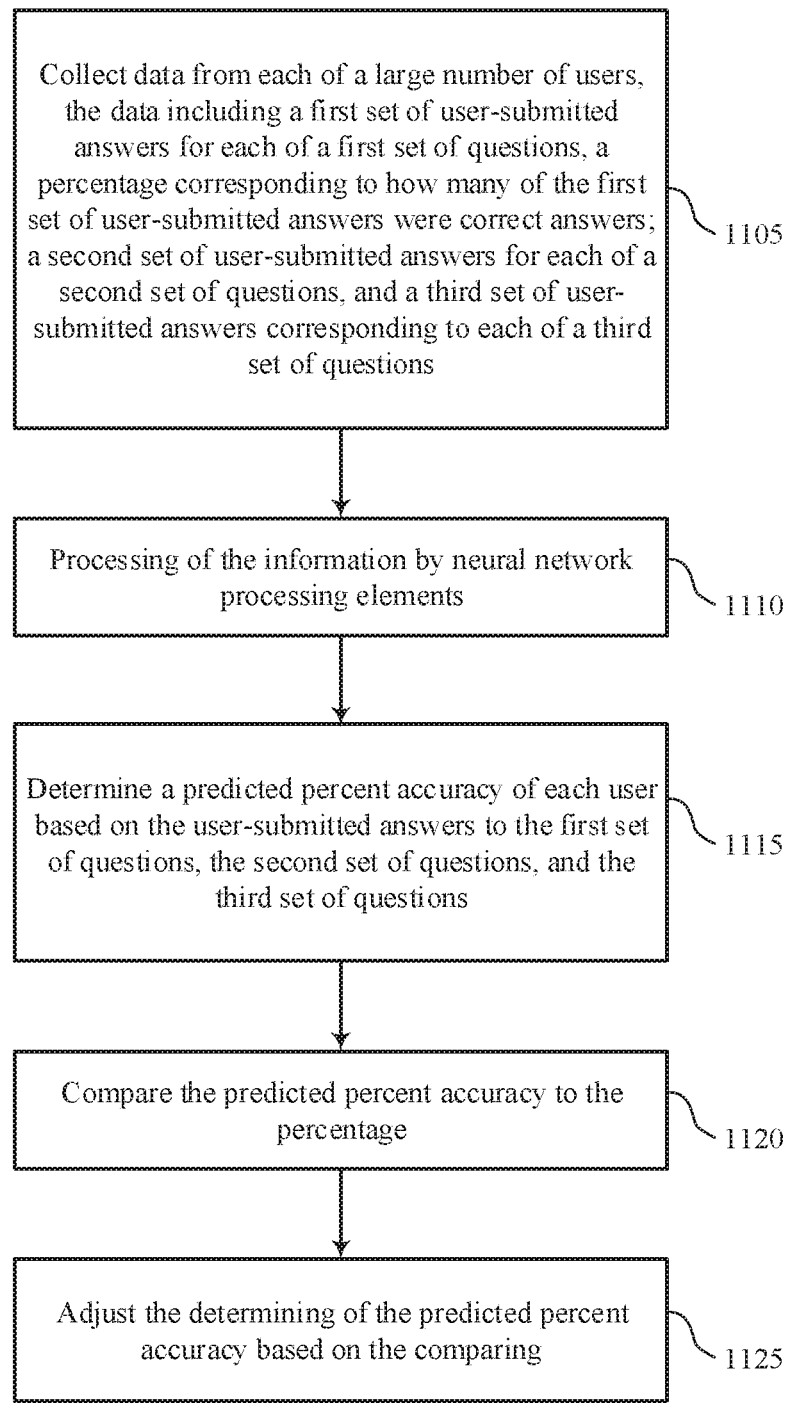
FIG. 11 is a flowchart of a process comprising neural network processing elements, for facilitating collaboration with closed-loop, dynamic group feedback in accordance with aspects of the present disclosure.

FIG. 11 illustrates an example of a process performed by the central collaboration server 102 (or other suitable computing device), further comprising neural network processing elements, for facilitating collaboration with closed-loop, dynamic group feedback in accordance with aspects of the present disclosure. In some examples, a computing device may execute a set of codes to control functional elements of the computing device to perform the described functions. Additionally or alternatively, a computing device may use special-purpose hardware. These operations may be performed according to the methods and processes described in accordance with aspects of the present disclosure. For example, the operations may be composed of various substeps, or may be performed in conjunction with other operations described herein.

At block 1105 the CCS 102 may collect data from each of a large number of users, the data including a first set of user-submitted answers for each of a first set of questions, a percentage corresponding to how many of the first set of user-submitted answers were correct answers; a second set of user-submitted answers for each of a second set of questions, and a third set of user-submitted answers corresponding to each of a third set of questions.

At block 1110 the data is processed by the neutral network processing elements.

At block 1115 the CCS 102 may determine a predicted percent accuracy of each user based on the user-submitted answers to the first set of questions, the second set of questions, and the third set of questions.

At block 1120 the CCS 102 may compare the predicted percent accuracy to the percentage.

At block 1125 the CCS 102 may adjust the determining of the predicted percent accuracy based on the comparing.

Referring again to FIG. 11, as described above, inventive heuristics have been developed to relate the answers given by human participants in pre-test questions with an ACC weighting factor that is used scale the impact that the human participant has within an Artificial Swarm Intelligence system. The ACC weighting factor is intended to adjust input based on the user's ability to express confidence (i.e. conviction) in their input in a manner that accurately relates to their level of knowledge/insight in the subject at hand. While the above heuristics are effective, another inventive approach disclosed herein is to use Machine Learning techniques to derive the relationship between the answers given to pre-test questions, and ACC weighting factors. This is done by collecting data for large numbers of test subjects and then training a neural network to derive the relationship.

In one embodiment, a two-layer neural network was employed. The top layer used a three-node rectifier linear unit (ReLU) function and took in as input sets of answers to pre-test questions. The bottom layer was a one-node ReLU output, that used the actual accuracy of the individual in predicting games. Specifically, the data used for input to the network were the answers to these three questions, for each of hundreds of different games (i.e. hundreds of different sporting events where a Team A faces a Team B):

1. Which team will win tonight, Team A or Team B? Answer: [ ] Team A or [ ] Team B 2. What is your confidence level? ANSWER: 0 to 100%

3. What percentage of other participants answered the same as you? ANSWER: 0 to 100%

And specifically, the data used for the output node was the actual predictive accuracy for the user for the particular game. This is a binary output, for the user was either CORRECT or INCORRECT in his or her prediction. Thus, the neural network was trained on a large set of data relating the answers to the three questions above (input) to the actual accuracy of the user in the prediction made for question #1—i.e. the outcome of the prediction, for that user, which was either Correct or Incorrect.

In this way a relation was derived that allows us to predict, based on the answers to the three questions above, whether a new user, who has no historical accuracy data, is likely to provide accurate predictive information or inaccurate predictive information when joining an Artificial Swarm Intelligence. It's a statistical prediction between 0% and 100%, indicating if a user is likely to be correct. This statistical prediction can then be used to compute an ACC weighting factor, not by heuristic but by using the responses given to sets of questions (for example, ten sets of sports predictions, each comprised of three questions like the set above) in trained neural network, which will output a percent likelihood that the user will make correct predictions. This percent likelihood can be divided by 100, and turned into an ACC weighting factor between 0 and 1. It is important to note that an inventive advantage of this approach is that new users (i.e., users who lack sufficient historical data about accuracy) can be assessed based not upon past performance but based only upon their answers to the pre-test questions and related introspective assessments.

The ACC weighting factor is then used to scale the User Intent Vector of the particular user in the artificial swarm intelligence. In this way, a set of users can answer a set of pre-test questions, can generate a set of pre-test data, that data can be input to a neural network, which then outputs percent likelihood of giving accurate prediction for each user, which can then be turned into an ACC weighting factor value for each user, which can then be used to scale the input for each user in the Artificial Swarm Intelligence. The swarm will then converge on predictions that have a substantially higher chance of being correct than if the ACC weighting factor values were not used. In this way, we build a smarter swarm intelligence that makes more accurate predictions.

While many embodiments are described herein, it is appreciated that this invention can have a range of variations that practice the same basic methods and achieve the novel collaborative capabilities that have been disclosed above. Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

While the invention herein disclosed has been described by means of specific embodiments, examples and applications thereof, numerous modifications and variations could be made thereto by those skilled in the art without departing from the scope of the invention set forth in the claims.

What is claimed is:

1. A method for determining an adaptive confidence calibration weighting factor associated with a user included in a group of users, wherein each user in the group is associated with a computing device in communication with a central collaboration server, wherein the adaptive confidence calibration weighting factor is used to weight input of the user during a real-time collaborative session, comprising the steps of:
   displaying, to the user by a computing device configured for the collaborative session, a plurality of questions;
   inputting, to the computing device by the user, a user answer for each question;
   inputting, to the computing device by the user, a user prediction value corresponding to the percentage of questions the user predicts he answered correctly;
   inputting, to the computer device by the user, a group prediction value corresponding to an average percentage of questions the user predicts the group answered correctly;
   determining a user percentage score for each user in the group of users, the user percentage score for each user indicating a percentage of the plurality of questions that the user answered correctly;
   determining a group percentage score for the group of users, the group percentage score indicating an average percentage of questions answered correctly across the group of users;
   calculating an adaptive confidence weighting factor for at least one user based on at least one of comparing the user prediction value input by that user with the user percentage score for that user, and comparing the group prediction value input by that user to the group percentage score for the group of users; and
   enabling the group to collaboratively select an answer to a question, wherein the adaptive confidence weighting factor associated with at least one user is used to scale a relative impact of that user on the collaborative session with respect to the impact of other users.

2. The method of claim 1, wherein:
   the adaptive confidence calibration weighting factor is a value between 0 and 1.

3. The method of claim 1, wherein:
   the calculating of the adaptive confidence calibration weighting factor further comprising calculating a self-assessment accuracy value based on a difference between the user prediction value and the user percentage score.

4. The method of claim 1, wherein:
   the calculating of the adaptive confidence calibration weighting factor further comprising calculating a group-assessment accuracy value based on a difference between the group prediction value and the group percentage score.

5. The method of claim 1, wherein:
at least one of the plurality of questions asks for the prediction of the outcome of a sporting event.

6. The method of claim 1, wherein:
at least one of the questions asks the user to rate his or her confidence in a prediction.

7. The method of claim 1, wherein:
at least one of the questions asks the user to rate his or her knowledge of a topic.

8. The method of claim 1, wherein:
at least one of the questions asks the user to predict what percentage of the other participants gave the same answer as that user did on a different one of the questions.

9. The method of claim 1, wherein:
the user answers are input to the computing device using graphical controls.

10. The method of claim 1, wherein:
at least one of the questions asks the user to assess a difficulty of a different one of the questions.

11. The method of claim 1, wherein the calculating of the adaptive confidence weighting factor is performed by the central collaboration server for a given user and communicated to the computing device associated with that user.

12. A system comprising a computing device and a central collaboration server, configured for determining an adaptive confidence calibration weighting factor having a value between 0 and 1 and associated with a user included in a group of users, wherein each user in the group is associated with a computing device in communication with the central collaboration server, wherein the adaptive confidence calibration weighting factor is used to weight input of the user during a real-time collaborative session, wherein the system is configured to:
  display, to each user by the computing device configured for the collaborative session, a plurality of questions;
  for each user, receive input of a user answer for each question;
  for each user, receive input of a user prediction value indicating to the percentage of the plurality of questions the user predicts he answered correctly;
  for each user, receive input of a group prediction value corresponding to an average percentage of questions the user predicts the group answered correctly;
  determine a user percentage score for each user in the group of users, the user percentage score for each user indicating a percentage of the plurality of questions answered correctly by the user;
  determine a group percentage score for the group of users, the group percentage score indicating an average percentage of questions answered correctly across the group of users;
  calculate the adaptive confidence calibration weighting factor for each user based on at least one of comparing the user prediction value to the user percentage score and comparing the group prediction value to the group percentage score; and
  enable the group to collaboratively select an answer to a question, wherein the adaptive confidence weighting factor associated with at least one user is used to scale a relative impact of that user on the collaborative session with respect to the impact of other users.

* * * * *

UNITED STATES PATENT AND TRADEMARK OFFICE
CERTIFICATE OF CORRECTION

PATENT NO. : 10,712,929 B2  
APPLICATION NO. : 15/898468  
DATED : July 14, 2020  
INVENTOR(S) : Rosenberg Page 1 of 1

It is certified that error appears in the above-identified patent and that said Letters Patent is hereby corrected as shown below:

On the Title Page

Item (63) Related U.S. Application Data, page 2, Column 1, Line 18, after "now Pat. No. 10,133,460" insert --application No. 15/898,468--.

Item (63) Related U.S. Application Data, page 2, Column 1, Lines 46-47, after "No." delete "15/898,468, provisional application No.".

Signed and Sealed this  
Thirteenth Day of October, 2020

Andrei Iancu  
*Director of the United States Patent and Trademark Office*